United States Patent
Shibahara et al.

(10) Patent No.: US 10,003,800 B2
(45) Date of Patent: Jun. 19, 2018

(54) IMAGE CODING METHOD, IMAGE DECODING METHOD, IMAGE CODING APPARATUS, AND IMAGE DECODING APPARATUS

(71) Applicant: Tagivan II LLC, Chevy Chase, MD (US)

(72) Inventors: Youji Shibahara, Tokyo (JP); Takahiro Nishi, Nara (JP); Toshiyasu Sugio, Osaka (JP); Kyoko Tanikawa, Osaka (JP); Toru Matsunobu, Osaka (JP); Hisao Sasai, Osaka (JP); Kengo Terada, Osaka (JP)

(73) Assignee: TAGIVAN II LLC, Chevy Chase, MD (US)

( * ) Notice: Subject to any disclaimer, the term of this patent is extended or adjusted under 35 U.S.C. 154(b) by 0 days. days.

(21) Appl. No.: 15/189,246

(22) Filed: Jun. 22, 2016

(65) Prior Publication Data
US 2016/0360201 A1 Dec. 8, 2016

Related U.S. Application Data

(63) Continuation of application No. 14/585,729, filed on Dec. 30, 2014, now Pat. No. 9,402,089, which is a
(Continued)

(51) Int. Cl.
*H04N 19/124* (2014.01)
*H04N 19/119* (2014.01)
(Continued)

(52) U.S. Cl.
CPC ........... *H04N 19/124* (2014.11); *G06T 9/004* (2013.01); *H04N 19/119* (2014.11);
(Continued)

(58) Field of Classification Search
None
See application file for complete search history.

(56) References Cited

U.S. PATENT DOCUMENTS 6,389,074 B1 * 5/2002 Andrew ............... H04N 19/619
375/240.05
6,466,732 B1 10/2002 Kimura et al.
(Continued)

FOREIGN PATENT DOCUMENTS

JP 2009-164936 7/2009
WO 2011/021839 2/2011

OTHER PUBLICATIONS

ITU-T H.264 Series H: Audiovisual and multimedia system, Mar. 2010.*
(Continued)

*Primary Examiner* — Kate Luo
(74) *Attorney, Agent, or Firm* — Wenderoth, Lind & Ponack, L.L.P.

(57) ABSTRACT

An image coding method, comprising: subtracting a prediction signal from the input image signal for each coding unit, thereby generating respective prediction error signals; performing orthogonal transform and quantization on a corresponding one of the prediction error signals for each transform unit, eventually generating quantization coefficients; and coding pieces of management information indicating a structure of the transform units and the quantization coefficients into a tree structure. Each of the transform units corresponds to a corresponding one of leaf nodes in the tree structure. In the coding, for each leaf node, management information and a quantization coefficient are coded, eventually generating a coded signal in which the coded management information and the coded quantization coefficient are arranged in succession for each leaf node.

2 Claims, 49 Drawing Sheets

Related U.S. Application Data continuation of application No. 14/302,837, filed on Jun. 12, 2014, now Pat. No. 8,958,473, which is a continuation of application No. 13/710,932, filed on Dec. 11, 2012, now Pat. No. 8,804,823.

(60) Provisional application No. 61/570,865, filed on Dec. 15, 2011.

(51) Int. Cl.
*H04N 19/61* (2014.01)
*G06T 9/00* (2006.01)
*H04N 19/96* (2014.01)
*H04N 19/463* (2014.01)
*H04N 19/176* (2014.01)

(52) U.S. Cl.
CPC ......... *H04N 19/176* (2014.11); *H04N 19/463* (2014.11); *H04N 19/61* (2014.11); *H04N 19/96* (2014.11)

(56) References Cited

U.S. PATENT DOCUMENTS

| | | | |
|---|---|---|---|
| 7,756,205 | B2 | 7/2010 | Toma et al. |
| 7,974,521 | B2 | 7/2011 | Toma et al. |
| 8,014,026 | B2* | 9/2011 | Cho ............... H04N 19/105 358/1.9 |
| 8,023,804 | B2 | 9/2011 | Toma et al. |
| 8,526,797 | B2 | 9/2013 | Toma et al. |
| 2006/0098734 | A1* | 5/2006 | Cho ............... H04N 19/423 375/240.03 |
| 2008/0260041 | A1* | 10/2008 | Au ............... H03M 7/30 375/240.24 |
| 2011/0274162 | A1* | 11/2011 | Zhou ............... H04N 19/176 375/240.03 |
| 2011/0299788 | A1* | 12/2011 | Suzuki ............... H04N 19/176 382/233 |

OTHER PUBLICATIONS

Summons to attend oral proceedings pursuant to Rule 115(1) EPC issued Oct. 12, 2016 in European Application No. 12858014.9.
ISO/IEC 14496-10 (MPEG-4 Part 10: Advanced Video Coding), Oct. 1, 2004.
International Search Report dated Mar. 19, 2013 in International Application No. PCT/JP2012/007843.
Xianglin Wang et al., "LCEC coded block flag coding under residual quadtree", Joint Collaborative Team on Video Coding (JCT-VC) of ITU-T SG16 WP3 and ISO/IEC JTC1/SC29/WG11, 4th Meeting: Daegu, KR, Jan. 20-28, 2011, JCTVC-D375, pp. 1-2, Retrieved from the Internet: <URL:http://wftp3.itu.int/av-arch/jctvc-site/2011_01_D_Daegu/>.
Bin Li et al., "Redundancy reduction in Cbf and Merging coding", Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, JCTVC-C277, pp. 1-8, Retrieved from the Internet: <URL: http://wftp.itu.int/av-arch/jctvc-site/2010_10_C_Guangzhou/>.
Minhua Zhou, "Evaluation results on Residual Quad Tree(RQT)", Joint Collaborative Team on Video Coding (JCT-VC) of ITU-T SG16 WP3 and ISO/IEC JTC1/SC29/WG11, 4th Meeting: Daegu, KR, Jan. 20-28, 2011, JCTVC-D060, pp. 1-7, Retrieved from the Internet: <URL: http://wftp3.itu.int/av-arch/jctvc-site/2011_01_D_Daegu/>.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d6, Ver. 7, 6th Meeting: Torino, IT, Jul. 14-22, 2011.
Office Action dated Sep. 26, 2013 in U.S. Appl. No. 13/906,970.
Wiegand et al., "Overview of the H.264/AVC Video Coding Standard", IEEE Trans. on Circuits and Systems for Video Technology, vol. 13, No. 7, Jul. 2003.
A partial Supplementary European Search Report dated Apr. 14, 2015 in European Application No. 12858014.9.
"Test Model under Consideration", Joint Collaborative Team on Video Coding (JCT-VC) of ITU-T SG16 WP3 and ISO/IEC JTC1/SC29/WG11, JCTVC-B205, 2nd Meeting: Geneva, CH, Jul. 21-28, 2010, XP030007704.
Bin Li et al., "Redundancy reduction in Cbf and Merging coding", Joint Collaborative Team on Video Coding (JCT-VC) of ITU-T SG16 WP3 and ISO/IEC JTC1/SC29/WG11, JCTVC-C277, 3rd Meeting: Guangzhou, CN, Oct. 7-15, 2010, XP055091761.
Partial European Search Report dated Jun. 22, 2017 in European Patent Application No. 17159363.5.
Extended European Search Report dated Oct. 27, 2017 in European Application No. 17159363.5.
Fang X et al., "A Unified LCU, sub-LCU and sub-CU (TU) Delta QP Signaling", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G893, Nov. 19, 2011 (Nov. 19, 2011), XP030110877.

\* cited by examiner

FIG. 14A

| cbf(0) | cbf(1) |
|---|---|
| cbf(2) | cbf(3) |

FIG. 14B

| cbf(0)=0 | cbf(1)=0 |
|---|---|
| cbf(2)=0 | cbf(3)→1 |

FIG. 14C cbf(d−1,0)=1

| cbf(d,0)=0 | cbf(d,1)=0 |
|---|---|
| cbf(d,2)=0 | cbf(d,3)→1 |

FIG. 14D cbf_cb(d−1,0)=0   cbf_cr(d−1,0)=0

| cbf_luma(d,0)=0 | cbf_luma(d,1)=0 |
|---|---|
| cbf_luma(d,2)=0 | cbf_luma(d,3)→1 |

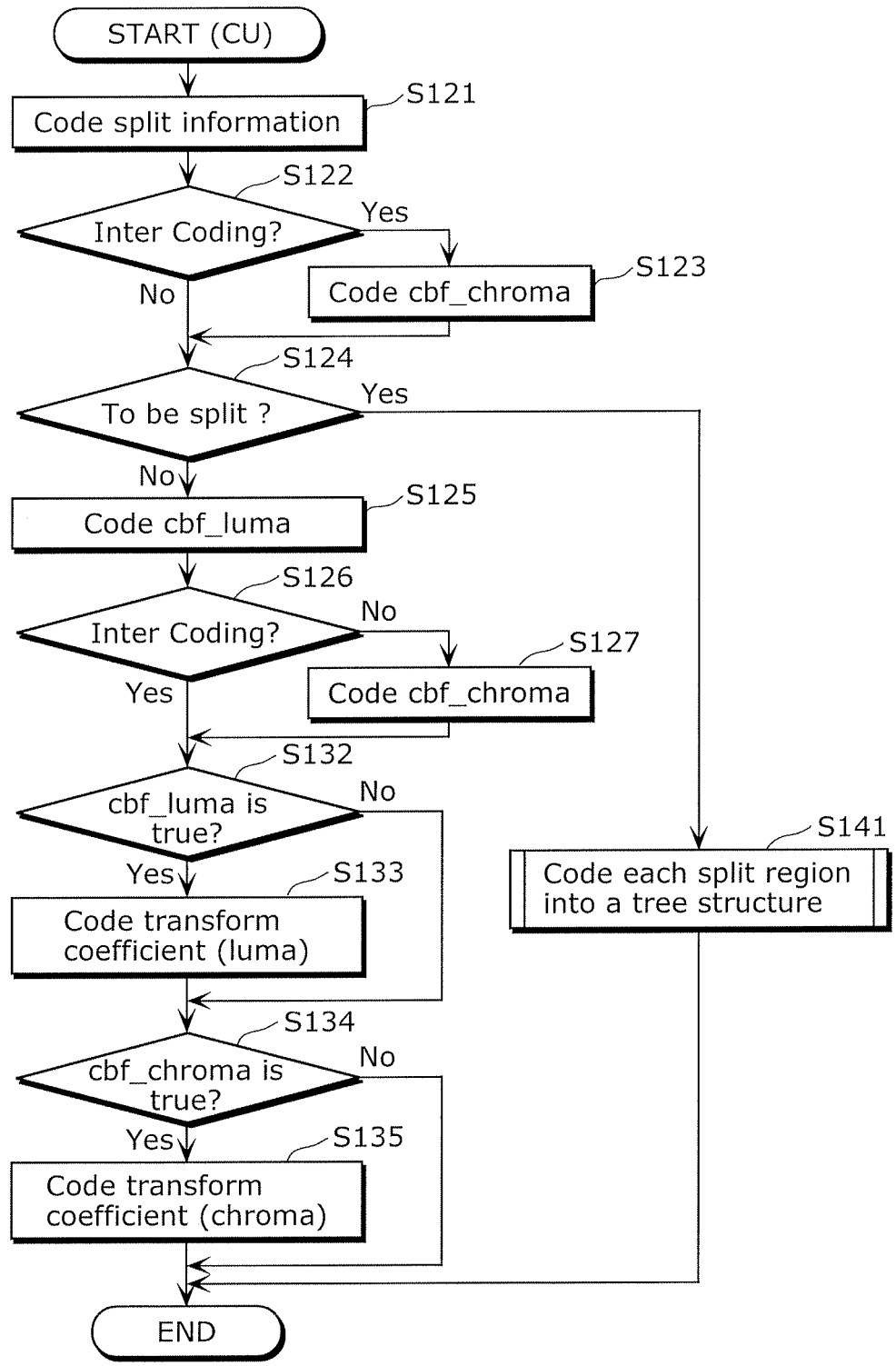

FIG. 18A cbf_luma

| 1 | 4 |
|---|---|
| 7 | 10 | cbf_cb

| 2 | 5 |
|---|---|
| 8 | 11 | cbf_cr

| 3 | 6 |
|---|---|
| 9 | 12 | block_coeff(luma)

| 13 | 16 |
|----|----|
| 19 | 22 | block_coeff(cb)

| 14 | 17 |
|----|----|
| 20 | 23 | block_coeff(cr)

| 15 | 18 |
|----|----|
| 21 | 24 |

FIG. 18B cbf_luma

| 1  | 7  |
|----|----|
| 13 | 19 | cbf_cb

| 2  | 8  |
|----|----|
| 14 | 20 | cbf_cr

| 3  | 9  |
|----|----|
| 15 | 21 | block_coeff(luma)

| 4  | 10 |
|----|----|
| 16 | 22 | block_coeff(cb)

| 5  | 11 |
|----|----|
| 17 | 23 | block_coeff(cr)

| 6  | 12 |
|----|----|
| 18 | 24 |

FIG. 18C cbf_luma

| 1 | 7 |
|---|---|
| 13 | 19 | cbf_cb

| 3 | 9 |
|---|---|
| 15 | 21 | cbf_cr

| 5 | 11 |
|---|---|
| 17 | 23 | block_coeff(luma)

| 2 | 8 |
|---|---|
| 14 | 20 | block_coeff(cb)

| 4 | 10 |
|---|---|
| 16 | 22 | block_coeff(cr)

| 6 | 12 |
|---|---|
| 18 | 24 |

FIG. 21A cbf_luma

| 3 | 9 |
|---|---|
| 15 | 21 | cbf_cb

| 1 | 7 |
|---|---|
| 13 | 19 | cbf_cr

| 2 | 8 |
|---|---|
| 14 | 20 | block_coeff(luma)

| 4 | 10 |
|---|---|
| 16 | 22 | block_coeff(cb)

| 5 | 11 |
|---|---|
| 17 | 23 | block_coeff(cr)

| 6 | 12 |
|---|---|
| 18 | 24 |

FIG. 21B cbf_luma

| 3 | 7 |
|---|---|
| 9 | 11 | cbf_cb

| 1 |
|---| cbf_cr

| 2 |
|---| block_coeff(luma)

| 4 | 8 |
|---|---|
| 10 | 12 | block_coeff(cb)

| 5 |
|---| block_coeff(cr)

| 6 |
|---|

FIG. 23

```
transform_tree( x0,y0, log2TrafoWidth, log2TrafoHeight, trafoDepth, blkIdx )
{
    split_transform_flag[ x0 ] [ y0 ] [ trafoDepth ]
    if( PredMode == Inter)
    {
        cbf_cb[ x0 ] [ y0 ] [ trafoDepth ]
        cbf_cr[ x0 ] [ y0 ] [ trafoDepth ]
    }
    if(split_transform_flag[ x0 ] [ y0 ] [ trafoDepth ] )
    {
        splitting into 4 regions and recursive call
    }
    else
    {
        if( PredMode == MODE_INTER)
        {
            cbf_luma[ x0 ] [ y0 ] [ trafoDepth ]
        }
        if( PredMode == MODE_INTRA )
        {
            cbf_luma[ x0 ] [ y0 ] [ trafoDepth ]
            cbf_cb[ x0 ] [ y0 ] [ trafoDepth ]
            cbf_cr[ x0 ] [ y0 ] [ trafoDepth ]
        }
        cu_qp_delta
        if(cbf_luma[ x0 ] [ y0 ] [ trafoDepth ] )
            residual_coding_cabac( x0, y0, log2TrafoSize, trafoDepth, scanIdx, cIdx 0 )
        if(cbf_cb[ x0 ] [ y0 ] [ trafoDepth ] )
            residual_coding_cabac( x0, y0, log2TrafoSize, trafoDepth, scanIdxC, 1 )
        if(cbf_cr[ x0 ] [ y0 ] [ trafoDepth ] )
            residual_coding_cabac( x0, y0, log2TrafoSize, trafoDepth, scanIdxC, 2 )
    }
}
```

FIG. 24A

```
transform_tree( x0,y0, log2TrafoWidth, log2TrafoHeight, trafoDepth, blkIdx){
    if( trafoDepth == 0 && IntraSplitFlag == 0) // IntraSplitFlag: 2Nx2N -> 0, NxN ->1
    {
        if( PredMode != MODE_INTRA )
            no_residual_data_flag
        residualDataPresentFlag = !no_residual_data_flag
    } else {
        residualDataPresentFlag = TRUE
    }
    if( residualDataPresentFlag)
    {
        log2TrafoSize = ( log2TrafoWidth + log2TrafoHeight ) >> 1
        intraSplitFlag = ( IntraSplitFlag && trafoDepth == 0 ? 1 : 0 )
        maxDepth = ( PredMode == MODE_INTRA ?
            max_transform_hierarchy_depth_intra + IntraSplitFlag :
            max_transform_hierarchy_depth_inter )
        xBase = x0 - ( x0 & (1 << log2TrafoWidth ) )
        yBase = y0- ( y0 & ( 1 << log2TrafoHeight ) )
        if( log2TrafoSize <= Log2MaxTrafoSize &&
            log2TrafoSize > Log2MinTrafoSize &&
            trafoDepth < maxDepth && !intraSplitFlag && entropy_coding_mode_flag )
            split_transform_flag[ x0 ] [ y0 ] [ trafoDepth ]
        if( PredMode != MODE_INTRA &&
            log2TrafoSize <= Log2MaxTrafoSize &&
            entropy_coding_mode_flag ){
            firstChromaCbf = ( log2TrafoSize == Log2MaxTrafoSize ||
                trafoDepth == 0 ? 1 :0 )
            if( firstChromaCbf || log2TrafoSize > Log2MinTrafoSize ){
                if( firstChromaCbf || cbf_cb[ xBase ] [ yBase ] [ trafoDepth - 1 ] ){
                    readCbf = true
                    if( blkIdx == 3 && log2TrafoSize < Log2MaxTrafoSize )
                        readCbf = cbf_cb[ xBase ] [ yBase ] [ trafoDepth ] ||
                            cbf_cb[ xBase + (1<< log2TrafoWidth )] [ yBase ] [ trafoDepth ] ||
                            cbf_cb[ xBase ] [ yBase + ( 1 << log2TrafoHeight )] [ trafoDepth ]
                    if(!readCbf )
                        cbf_cb[ x0 ] [ y0 ] [ trafoDepth ] = 1
                    else
                        cbf_cb[ x0 ] [ y0 ] [ trafoDepth ]
                }
                if( firstChromaCbf || cbf_cr[ xBase ] [ yBase ] [ trafoDepth ? 1 ] ){
                    readCbf = true
                    if( blkIdx == 3 && log2TrafoSize < Log2MaxTrafoSize )
                        readCbf = cbf_cr[ xBase ] [ yBase ] [ trafoDepth ] ||
                            cbf_cr[ xBase + (1 << log2TrafoWidth )] [ yBase ] [ trafoDepth ] ||
                            cbf_cr[ xBase ] [ yBase + (1 << log2TrafoHeight )] [ trafoDepth ]
                    if (!readCbf )
                        cbf_cr[ x0 ] [ y0 ] [ trafoDepth ] = 1
                    else
                        cbf_cr[ x0 ] [ y0 ] [ trafoDepth ]
                }
            }
        }
                ⋮
```

```
if( split_transform_flag[ x0 ] [ y0 ] [ trafoDepth ] ){
    if( InterTUSplitDirection == 2 ){ // square split
        x1 = x0 + (( 1 << log2TrafoWidth ) >> 1 )
        y1 = y0
        x2 = x0
        y2 = y0 + (( 1 << log2TrafoHeight )>> 1 )
        x3 = x1
        y3 = y2
    } else {
        x1 = x0 + ((1 << log2TrafoWidth ) >> 2 ) * InterTUSplitDirection
        y1 = y0 + ((1 << log2TrafoHeight) >> 2 ) * (1 - InterTUSplitDirection )
        x2 = x1 + ((1 << log2TrafoWidth ) >>2 ) * InterTUSplitDirection
        y2 = y1 + ((1 << log2TrafoHeight) >> 2 ) * (1 - InterTUSplitDirection )
        x3 = x2 + ((1 << log2TrafoWidth ) >> 2 ) * InterTUSplitDirection
        y3 = y2 + ((1 << log2TrafoHeight) >> 2 ) * (1 - InterTUSplitDirection )
        log2TrafoHeight = log2TrafoHeight + 2 * InterTUSplitDirection - 1
        log2TrafoWidth = log2TrafoWidth - 2 * InterTUSplitDirection + 1
    }
    transform_tree(x0, y0, x0, y0, log2TrafoWidth - 1, log2TrafoHeight -1, trafoDepth + 1, 0 )
    transform_tree(x1, y1, x0, y0, log2TrafoWidth - 1, log2TrafoHeight -1, trafoDepth + 1, 1 )
    transform_tree(x2, y2, x0, y0, log2TrafoWidth - 1, log2TrafoHeight -1, trafoDepth + 1, 2 )
    transform_tree(x3, y3, x0, y0, log2TrafoWidth - 1, log2TrafoHeight -1, trafoDepth + 1, 3 )
} else{
    if( PredMode != MODE_INTRA && ( trafoDepth != 0 ||
        cbf_cb[ x0 ] [ y0 ] [ trafoDepth ] ||
        cbf_cr[ x0 ] [ y0 ] [ trafoDepth ] )){
        readCbf = true
        if( blkIdx == 3 && log2TrafoSize < Log2MaxTrafoSize)
            readCbf = cbf_luma[ xBase ] [ yBase ] [ trafoDepth ] ||
            cbf_luma[ xBase + (1 << log2TrafoWidth )] [ yBase ] [ trafoDepth ] ||
            cbf_luma[ xBase ] [ yBase + (1 << log2TrafoHeight)] [ trafoDepth ] ||
            cbf_cb[ xBase ] [ yBase ] [ trafoDepth - 1] ||
            cbf_cr[ xBase ] [ yBase ] [ trafoDepth - 1]
        if ( !readCbf )
            cbf_luma[ x0 ] [ y0 ] [ trafoDepth ] = 1
        else
            cbf_luma[ x0 ] [ y0 ] [ trafoDepth ]
    }
    if( PredMode == MODE_INTRA )
    {
        cbf_luma[ x0 ] [ y0 ] [ trafoDepth ]
        log2TrafoSize = ( log2TrafoWidth + log2TrafoHeight ) >> 1
        log2TrafoSizeC = ( log2TrafoSize== Log2MinTrafoSize)?log2TrafoSize : (log2TrafoSize - 1)
        if((log2TrafoSize > Log2MinTrafoSize )|| (log2TrafoSize == Log2MinTrafoSize &&blk == 3 ))
        {
            cbf_cb[ x0 ] [ y0 ] [ trafoDepth ]
            cbf_cr[ x0 ] [ y0 ] [ trafoDepth ]
        }
    }
```

```
...
if( cbf_luma[ x0 ] [ y0 ] [ trafoDepth ] || cbf_cb[ x0 ] [ y0 ] [ trafoDepth ] || cbf_cr[ x0 ] [ y0 ] [ trafoDepth ] )
{
    if( cu_qp_delta_enabled_flag && !IsCuQpDeltaCoded ){
        cu_qp_delta
        IsCuQpDeltaCoded = 1
    }
}
log2TrafoSize = ( log2TrafoWidth + log2TrafoHeight ) >> 1
log2TrafoSizeC = ( log2TrafoSize== Log2MinTrafoSize )? log2TrafoSize : (log2TrafoSize - 1 )
if( cbf_luma[ x0 ] [ y0 ] [ trafoDepth ] )
    residual_coding_cabac( x0, y0, log2TrafoSize, trafoDepth, scanIdx, cIdx 0 )
if(log2TrafoSize >Log2MinTrafoSize)
{
    if( cbf_cb[ x0 ] [ y0 ] [ trafoDepth ] )
        residual_coding_cabac( x0, y0, log2TrafoSize, trafoDepth, scanIdxC, 1 )
    if( cbf_cr[ x0 ] [ y0 ] [ trafoDepth ] )
        residual_coding_cabac( x0, y0, log2TrafoSize, trafoDepth, scanIdxC, 2 )
} else if( log2TrafoSize == Log2MinTrafoSize && blk == 3 )
{
    if( cbf_cb[ xC ] [ yC ] [ trafoDepth ] )
        residual_coding_cabac(xC, yC, log2TrafoSize, trafoDepth, scanIdxC, 1 )
    if( cbf_cr[ xC ] [ yC ] [ trafoDepth ] )
        residual_coding_cabac(xC, yC, log2TrafoSize, trafoDepth, scanIdxC, 2 )
}
```

FIG. 32

| |
|---|
| Video stream (PID=0x1011 Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00 Secondary video) |
| Video stream (PID=0x1B01 Secondary video) |

FIG. 35
Stream of TS packets
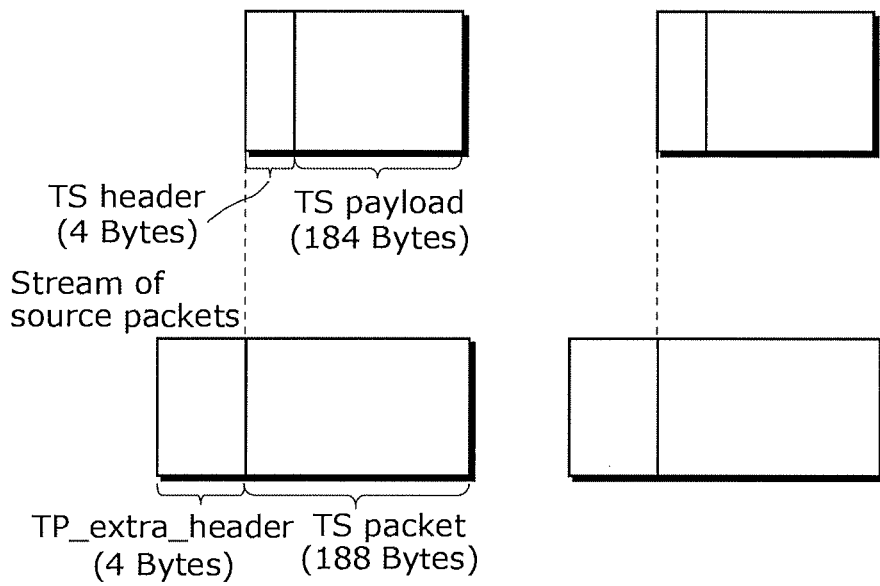
Multiplexed data
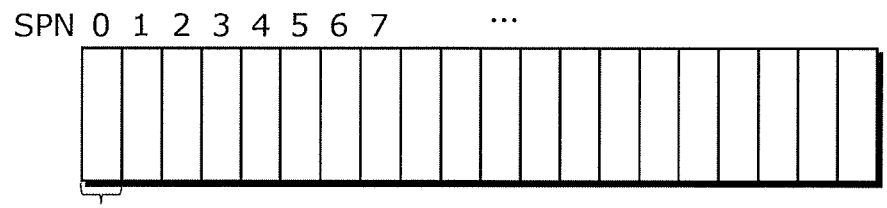
Source packet Data structure of PMT

FIG. 43

| Corresponding standard | Driving frequency |
|---|---|
| MPEG4.AVC | 500 MHz |
| MPEG-2 | 350 MHz |
| ⋮ | ⋮ | ex900 ex1000

IMAGE CODING METHOD, IMAGE DECODING METHOD, IMAGE CODING APPARATUS, AND IMAGE DECODING APPARATUS

TECHNICAL FIELD

One or more exemplary embodiments disclosed herein relate generally to image coding methods, image decoding methods, image coding apparatuses, image decoding apparatuses, and image coding/decoding apparatuses.

BACKGROUND ART

In order to compress audio data and video data, various audio coding standards and video coding standards have been developed. Examples of such video coding standards are International Telecommunication Union Telecommunication Standardization Sector (ITU-T) standard called H.26x and International Organization for Standardization/International Electrotechnical Commission (ISO/IEC) standard called MPEG-x (see Non-Patent Literature 1, for example). The latest video coding standard is called H.264/MPEG-4AVC. Recently, a new-generation coding standard called High Efficiency Video Coding (HEVC) has been examined.

CITATION LIST

Non Patent Literature

[NPL 1] ISO/IEC 14496-10 "MPEG-4 Part10 Advanced Video Coding"

SUMMARY OF INVENTION

Technical Problem

In such image coding methods and image decoding method, it has been demanded to reduce a data amount in a memory for temporarily holding data used in coding or decoding.

In order to address the above, one non-limiting and exemplary embodiment provides an image coding method and an image decoding method which are capable of reducing a data amount in a memory for temporarily holding data used in coding or decoding.

Solution to Problem

In one general aspect, the techniques disclosed here feature, there is provided an image coding method, comprising: splitting an input image signal into a plurality of coding units, and subtracting a prediction signal from the input image signal for each of the coding units, eventually generating prediction error signals of the respective coding units; splitting each of the coding units into a plurality of transform units, and performing orthogonal transform and quantization on a corresponding one of the prediction error signals for each of the transform units, eventually generating quantization coefficients of the respective coding units; and coding pieces of management information and the quantization coefficients into a tree structure, the pieces of management information indicating a structure of the transform units, wherein each of the transform units corresponds to a corresponding one of leaf nodes in the tree structure, and in the coding, for each of the leaf nodes, a corresponding piece of the management information and a corresponding one of the quantization coefficients are coded, eventually generating a coded signal in which the coded corresponding piece of the management information and the coded corresponding one of the quantization coefficients are arranged in succession for the each of the leaf nodes.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects of Invention

One non-limiting and exemplary embodiment provides an image coding method and an image decoding method which are capable of reducing a data amount in a memory for temporarily holding data used in coding or decoding.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 14A is a diagram for explaining CBF coding according to Embodiment 2.

FIG. 14B is a diagram for explaining CBF coding according to Embodiment 2.

FIG. 14C is a diagram for explaining CBF coding according to Embodiment 2.

FIG. 14D is a diagram for explaining CBF coding according to Embodiment 2.

FIG. 15 is a flowchart of coding according to Embodiment 3.

FIG. 18A is a diagram showing an example of an order of coding CBFs and transform coefficients according to Embodiment 5.

FIG. 18B is a diagram showing an example of an order of coding CBFs and transform coefficients according to Embodiment 5.

FIG. 18C is a diagram showing an example of an order of coding CBFs and transform coefficients according to Embodiment 5.

FIG. 21A is a diagram showing an example of an order of coding CBFs and transform coefficients according to Embodiment 5.

FIG. 21B is a diagram showing an example of an order of coding CBFs and transform coefficients according to Embodiment 5.

FIG. 23 is a diagram showing an example of a syntax according to Embodiment 6.

FIG. 24A is a diagram showing an example of a syntax according to Embodiment 6.

FIG. 24B is a diagram showing an example of a syntax according to Embodiment 6.

FIG. 24C is a diagram showing an example of a syntax according to Embodiment 6.

FIG. 32 illustrates a structure of multiplexed data;

FIG. 35 shows a structure of TS packets and source packets in the multiplexed data;

FIG. 43 shows an example of a look-up table in which video data standards are associated with driving frequencies;

DESCRIPTION OF EMBODIMENTS (Underlying Knowledge Forming Basis of the Present Disclosure)

In relation to the disclosures in the Background section, the inventors have found the following problem.

The following describes a coding method and a decoding method according to the disclosed comparison example.

Figure 1:
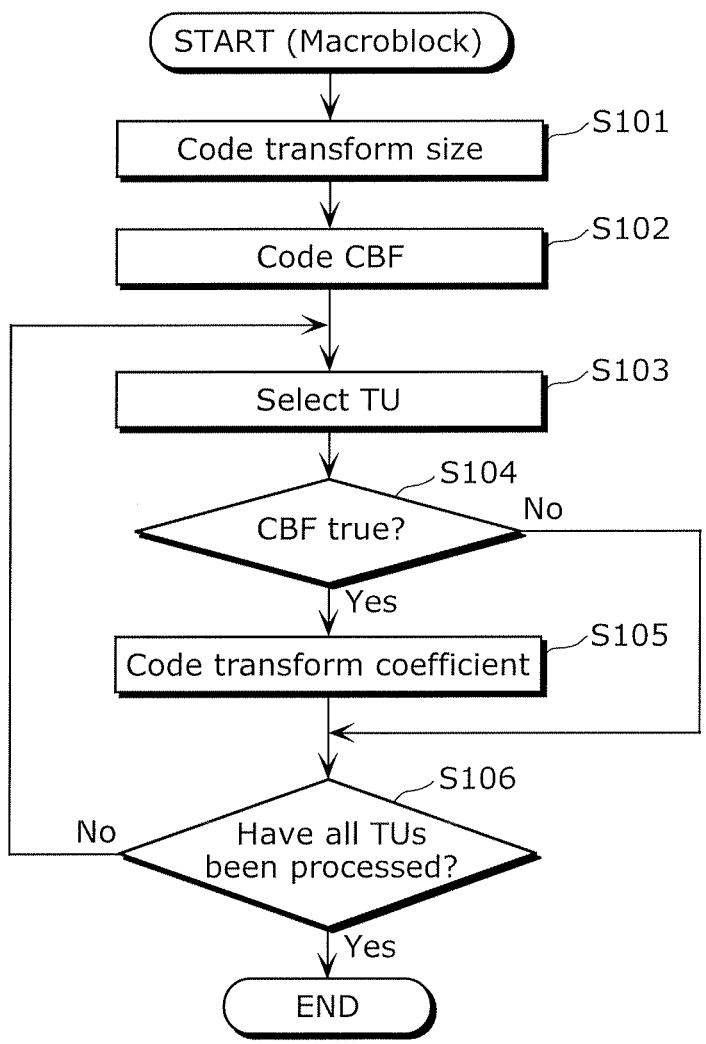
FIG. 1 is a flowchart of coding according to a comparison example.

FIG. 1 is a flowchart of the coding method according to the comparison example.

A picture (in other words, a frame) is split into macroblocks each having the same size of 16 pixels×16 pixels. The plurality of macroblocks are coded, for example, sequentially in a raster scan order. FIG. 1 shows coding of one macroblock.

First, one of various orthogonal transform sizes is selected as a transform size for a current macroblock to be coded. The transform size is smaller than a size of the macroblock. For example, the transform size is 4 pixels×4 pixels or 8 pixels×8 pixels. Hereinafter, the unit for transform is referred to as a "transform unit (TU)". Then, information indicating the selected transform size is coded (S101). A flag indicating the transform size is, for example, transform_size_flag.

Next, a CBF is coded (S102). Here, a CBF refers to flag information indicating whether or not a transform coefficient (quantization coefficient) of a TU exists.

Next, a TU is selected. For example, a plurality of TUs are sequentially selected in a Z scan order, and the selected TU is applied with the following processing.

If the CBF is true (Yes at S104), then a transform coefficient of the current TU is coded (S105). On the other hand, if the CBF is false (No at S104), then the transform coefficient of the current TU is not coded. The series of steps S103 to S105 are performed on each of the TUs included in the current macroblock (S106).

Decoding is also performed in the same order as shown in FIG. 1. In other words, decoding can be explained by replacing the "coding" by "decoding" in the above description.

Here, in order to efficiently code a picture, flexible selection of transform size is important. However, the inventors have found that a data amount of information indicating a transform size is increased, as the flexibility in selecting a transform size is improved.

According to an exemplary embodiment disclosed herein to solve the above-described problems, an image coding method, comprising: splitting an input image signal into a plurality of coding units, and subtracting a prediction signal from the input image signal for each of the coding units, eventually generating prediction error signals of the respective coding units; splitting each of the coding units into a plurality of transform units, and performing orthogonal transform and quantization on a corresponding one of the prediction error signals for each of the transform units, eventually generating quantization coefficients of the respective coding units; and coding pieces of management information and the quantization coefficients into a tree structure, the pieces of management information indicating a structure of the transform units, wherein each of the transform units corresponds to a corresponding one of leaf nodes in the tree structure, and in the coding, for each of the leaf nodes, a corresponding piece of the management information and a corresponding one of the quantization coefficients are coded, eventually generating a coded signal in which the coded corresponding piece of the management information and the coded corresponding one of the quantization coefficients are arranged in succession for the each of the leaf nodes.

By the method, a piece of management information and a quantization coefficient of each of transform units are continuously coded. Therefore, each of the image coding apparatus and the image decoding apparatus does not need to cause a memory to hold pieces of management information of other transform units. As described above, the image coding method can reduce a data amount of a memory for temporarily storing pieces of data to be used in coding or decoding.

It is possible that the pieces of the management information includes respective pieces of split information each of which corresponds to a corresponding one of nodes in the tree structure and indicates whether or not a transform unit corresponding to the corresponding one of the nodes is to be further split.

It is also possible that the pieces of the management information includes respective first flags each of which corresponds to at least one of the nodes in the tree structure and indicates whether or not a quantization coefficient corresponding to each of the at least one of the nodes exists.

It is further possible that in the coding, it is determined whether or not a value of the first flag of a current node at a current level can be uniquely identified by at least one of (a) the first flag at a level upper than the current level and (b) the first flag of a different node at the current level, and when it is determined that the value of the first flag of the current node can be uniquely identified, the first flag of the current node is not coded.

Therefore, the image coding method can reduce a coding amount of the coded signal.

It is further possible that the coding includes coding a difference quantization step at the each of the leaf nodes in the coded signal, the coded difference quantization step being arranged at a position corresponding to the each of the leaf nodes in the tree structure, and the difference quantization step indicates, in the performing of orthogonal transform and quantization, a difference between a quantization step that has most recently been used and a quantization step that is to be used for a current transform unit.

By the method, the image coding method can arrange the difference quantization step and the transform coefficient at close positions in the coded signal. As a result, the image coding method can reduce an amount of a memory for temporarily storing data in the image decoding apparatus.

It is further possible that the coding includes coding a difference quantization step at a root of the tree structure in the coded signal, the coded difference quantization step being arranged at a position corresponding to the root, and the difference quantization step indicates, in the performing of orthogonal transform and quantization, a difference between a quantization step that has most recently been used and a quantization step that is to be used for a current transform unit.

By the above method, the image coding method can reduce a coding amount of the coded signal.

It is further possible that each of the quantization coefficients includes a luminance quantization coefficient and a chrominance quantization coefficient, and the first flag includes a second flag and a third flag, the second flag indicating whether or not the luminance quantization coefficient exists, and the third flag indicating whether or not the chrominance quantization coefficient exists, wherein in the coding, for each of the at least one of the nodes, the second flag is coded after coding the third flag, thereby generating the coded signal in which the coded second flag is arranged after the coded third flag.

It is further possible that each of the quantization coefficients includes a luminance quantization coefficient, a chrominance Cb quantization coefficient, and a chrominance Cr quantization coefficient, the first flag includes a second flag, a third flag, and a fourth flag, the second flag indicating whether or not the luminance quantization coefficient exists, the third flag indicating whether or not the chrominance Cb quantization coefficient exists, and the fourth flag indicating whether or not the chrominance Cr quantization coefficient exists, and in the coding, for each of the at least one of the nodes, the third flag, the fourth flag, the second flag, the luminance quantization coefficient, the chrominance Cb quantization coefficient, and the chrominance Cr quantization coefficient are coded in order, thereby generating the coded signal in which the coded third flag, the coded fourth flag, the coded second flag, the coded luminance quantization coefficient, the coded chrominance Cb quantization coefficient, and the coded chrominance Cr quantization coefficient are arranged in order.

According to another exemplary embodiment disclosed herein, it is further possible that an image decoding method, comprising: decoding a coded signal to generate quantization coefficients and pieces of management information, the quantization coefficients each corresponding to a corresponding one of transform units, and the pieces of the management information indicating a structure of the transform units; performing inverse quantization and inverse transform on each of the quantization coefficients, eventually generating prediction error signals of the respective transform units; and adding at least one of the prediction error signals to a prediction signal for each of coding units each including the transform units, eventually generating decoded signals for each of the coding units, the quantization coefficients and the pieces of the management information have a tree structure, each of the transform units corresponds to a corresponding one of leaf nodes in the tree structure, and the decoding includes decoding, for each of the leaf nodes, a coded piece of the management information and a coded quantization coefficient which are arranged in succession in the coded signal for the each of the leaf nodes.

By the method, a piece of management information and a quantization coefficient of each of transform units are continuously coded. Therefore, the image decoding apparatus does not need to cause a memory to hold pieces of management information of other transform units. As described above, the image decoding method can reduce a data amount of a memory for temporarily storing pieces of data to be used in decoding.

It is possible that the pieces of the management information includes respective pieces of split information each of which corresponds to a corresponding one of nodes in the tree structure and indicates whether or not a transform unit corresponding to the corresponding one of the nodes is to be further split.

It is also possible that the pieces of the management information includes respective first flags each of which corresponds to at least one of the nodes in the tree structure and indicates whether or not a quantization coefficient corresponding to each of the at least one of the nodes exists.

It is further possible that in the decoding, it is determined whether or not a value of the first flag of a current node at a current level can be identified by at least one of (a) the first flag at a level upper than the current level and (b) the first flag of a different node at the current level, and when it is determined that the value of the first flag of the current node can be uniquely identified, the first flag of the current node is not generated by decoding.

By this method, a coding amount of the coded signal can be reduced.

It is further possible that the decoding includes decoding a difference quantization step at a current leaf node in the coded signal, the difference quantization step being arranged at a position corresponding to the current leaf node in the tree structure, and the difference quantization step indicates, in the performing of inverse quantization and inverse orthogonal transform, a difference between a quantization step that has most recently been used and a quantization step that is to be used for a current transform unit.

By the method, a difference quantization step and a transform coefficient are arranged close to each other in a coded signal. As a result, the image decoding method can reduce an amount of a memory for temporarily storing data in the image decoding apparatus.

It is further possible that the decoding includes decoding a difference quantization step at a root of the tree structure in the coded signal, the difference quantization step being coded arranged at a position corresponding to the root, and the difference quantization step indicates, in the performing of inverse quantization and inverse orthogonal transform, a difference between a quantization step that has most recently been used and a quantization step that is to be used for a current transform unit.

By this method, a coding amount of the coded signal can be reduced.

It is further possible that each of the quantization coefficients includes a luminance quantization coefficient and a chrominance quantization coefficient, and the first flag includes a second flag and a third flag, the second flag indicating whether or not the luminance quantization coefficient exists, and the third flag indicating whether or not the chrominance quantization coefficient exists, in the coded signal, the second flag that is coded is arranged after the third flag that is coded, in the decoding, the second flag that is coded is decoded after decoding the third flag that is coded, for each of the at least one of the nodes.

It is further possible that each of the quantization coefficients includes a luminance quantization coefficient, a chrominance Cb quantization coefficient, and a chrominance Cr quantization coefficient, the first flag includes a second flag, a third flag, and a fourth flag, the second flag indicating whether or not the luminance quantization coefficient exists, the third flag indicating whether or not the chrominance Cb quantization coefficient exists, and the fourth flag indicating whether or not the chrominance Cr quantization coefficient exists, and the third flag that is coded, the fourth flag that is coded, the second flag that is coded, the luminance quantization coefficient that is coded, the chrominance Cb quantization coefficient that is coded, and the chrominance Cr quantization coefficient that is coded are arranged in order in the coded signal, and in the decoding, for each of the at least one of the nodes, the third flag that is coded, the fourth flag that is coded, the second flag that is coded, the luminance quantization coefficient that is coded, the chrominance Cb quantization coefficient that is coded, and the chrominance Cr quantization coefficient that is coded are decoded in order.

According to still another exemplary embodiment disclosed herein, an image coding apparatus which performs the above-described image coding method.

By the method, a piece of management information and a quantization coefficient of each of transform units are continuously coded. Therefore, each of the image coding apparatus and the image decoding apparatus does not need to cause a memory to hold pieces of management information of other transform units. As described above, the image coding apparatus can reduce a data amount of a memory for temporarily storing pieces of data to be used in coding or decoding.

According to still another exemplary embodiment disclosed herein, an image decoding apparatus which performs the above-described image decoding method.

By the method, a piece of management information and a quantization coefficient of each of transform units are continuously coded. Therefore, the image decoding apparatus does not need to cause a memory to hold pieces of management information of other transform units. As described above, the image decoding apparatus can reduce a data amount of a memory for temporarily storing pieces of data to be used in decoding.

According to still another exemplary embodiment disclosed herein, an image coding/decoding apparatus includes the above-described image coding apparatus and the above-described image decoding apparatus.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

The following describes embodiments with reference to the drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

The image coding apparatus according to Embodiment 1 splits a block as a unit to be coded, hierarchically into a plurality of the transform units. In addition, the image coding apparatus codes, into a tree structure, (a) pieces of management information indicating a structure of the transform units, and (b) transform coefficients. As a result, the image coding apparatus is capable of suppressing the increase of pieces of information indicating the structure of the transform units, and also capable of increasing the flexibility in selecting a transform size.

First, structures of an image coding apparatus and an image decoding apparatus are described.

Figure 2:
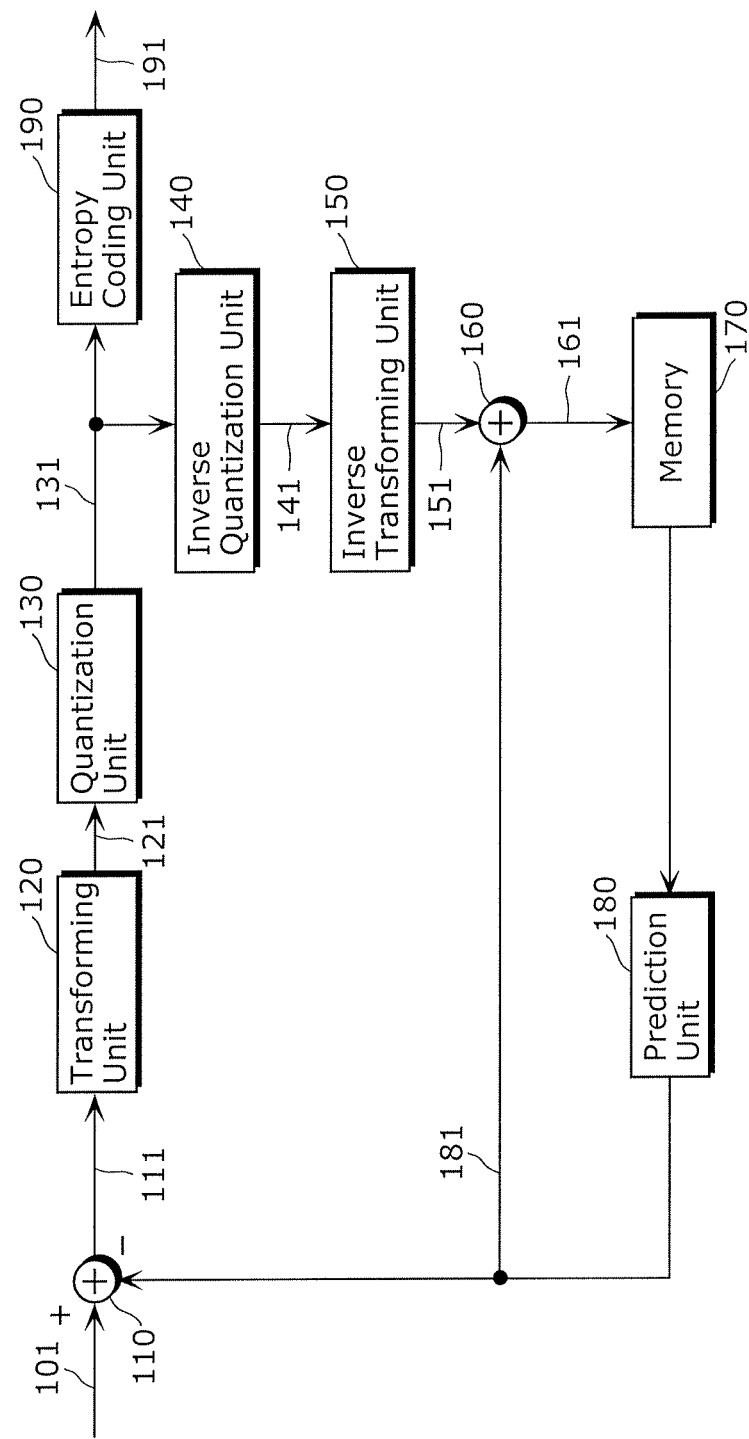
FIG. 2 is a block diagram of an image coding apparatus according to Embodiment 1.

FIG. 2 is a block diagram of the image coding apparatus 100 according to the present embodiment. The image coding apparatus 100 codes, for example, audio data and video data at a low bit-rate.

The image coding apparatus 100 shown in FIG. 2 codes an input image signal 101 to generate a coded signal 191. The image coding apparatus 100 includes a subtractor 110, a transforming unit 120, a quantization unit 130, an inverse quantization unit 140, an inverse transforming unit 150, an adder 160, a memory 170, a prediction unit 180, and an entropy coding unit 190.

Here, a picture (in other words, frame) is split into a plurality of Coding Units (CU) to be coded. Each picture is therefore coded on a CU-by-CU basis. Each of the CUs is further split into one or more Transform Units (TU).

The subtractor 110 splits an input image signal 101 into a plurality of CUs. Then, for each of the CUs, the subtractor 110 subtracts a prediction signal 181 from the input image signal 101 to generate a prediction error signal 111 (transform input signal), and provides the generated prediction error signal 111 to the transforming unit 120.

The transforming unit 120 splits a CU into one or more TUs. Then, for each of the TUs, the transforming unit 120 performs frequency transform on a corresponding prediction error signal 111 to generate a transform output signal 121. More specifically, the transforming unit 120 transforms, from a temporal-spatial domain to a frequency domain, the prediction error signal 111 or the transform input signal generated by performing certain processing on the prediction error signal 111. As a result, the transforming unit 120 generates the transform output signal 121 having decreased correlation.

The quantization unit 130 quantizes the transform output signal 121 for each of the TUs, thereby generating a quantization coefficient 131 having a small total amount of data.

The entropy coding unit 190 codes the quantization coefficient 131 by using an entropy coding algorithm, thereby generating a coded signal 191 having further compressed redundancy.

For each of the TUs, the inverse quantization unit 140 inversely quantizes the quantization coefficient 131 to generate a decoded transform output signal 141. For each of the TUs, the inverse transforming unit 150 inversely transforms the decoded transform output signal 141 to generate a decoded transform input signal 151.

For each of the CUs, the adder 160 adds the decoded transform input signal 151 with a prediction signal 181 to generate a decoded signal 161. The memory 170 stores the decoded signal 161.

For each of the CUs, the prediction unit 180 obtains a predetermined signal from the memory 170 according to a prediction method such as intra prediction or inter prediction, and generates a prediction signal 181 according to a predetermined method based on the prediction method. More specifically, the prediction unit 180 determines the prediction method to achieve a maximum coding efficiency, and generates the prediction signal 181 according to the determined prediction method. Furthermore, the entropy coding unit 190 performs entropy coding on the information indicating the prediction method, as needed.

Here, the inverse quantization unit 140, the inverse transforming unit 150, the adder 160, the memory 170, and the prediction unit 180 are included also in the image decoding apparatus. The decoded signal 161 corresponds to a reproduced image signal (decoded signal 261) generated by the image decoding apparatus.

Figure 3:
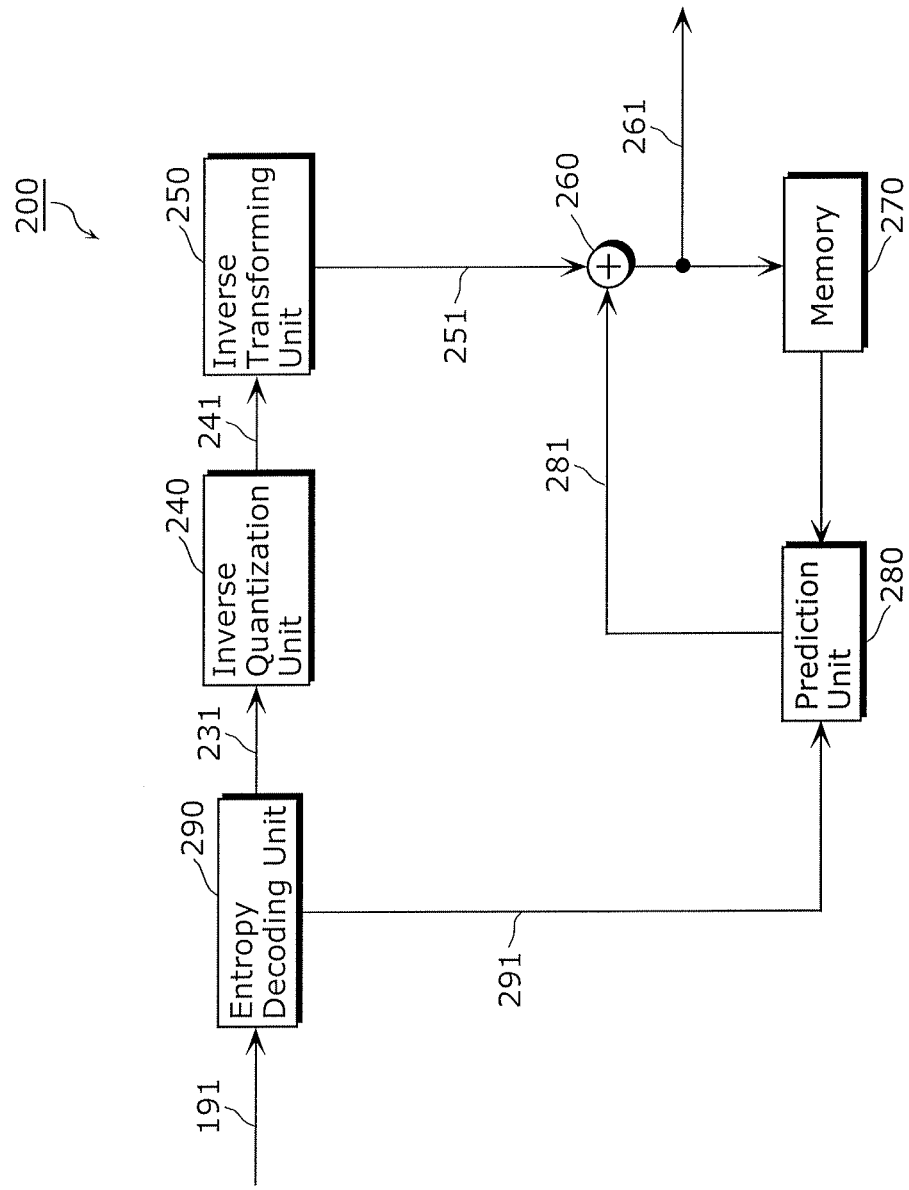
FIG. 3 is a block diagram of an image decoding apparatus according to Embodiment 1.

FIG. 3 is a block diagram of the image decoding apparatus. The image decoding apparatus 200 shown in FIG. 3 decodes a coded signal 191 to generate a decoded signal 261. The image decoding apparatus 200 includes an inverse quantization unit 240, an inverse transforming unit 250, an adder 260, a memory 270, a prediction unit 280, and an entropy decoding unit 290.

The entropy decoding unit 290 performs entropy decoding on the coded signal 191 to generate a quantization coefficient 231 and a prediction method 291.

For each of TUs, the inverse quantization unit 240 inversely quantizes the quantization coefficient 231 to generate a decoded transform output signal 241. The inverse transforming unit 250 inversely transforms the decoded transform output signal 241 to generate a decoded transform input signal 251.

For each of CUs, the adder 260 adds the decoded transform input signal 251 with a prediction signal 281 to generate a decoded signal 261. The decoded signal 261 is a reproduced image generated by the image decoding apparatus 200. The decoded signal 261 is outputted as an output signal of the image decoding apparatus 200, and also stored into the memory 270.

For each of the CUs, the prediction unit 280 obtains a predetermined signal from the memory 270 according to the prediction method 291, and generates a prediction signal 281 according to a predetermined method based on the prediction method 291.

Hereinafter, the quantization coefficients 131 and 231 are referred to also as "transform coefficients" or "block transform coefficients".

According to the present embodiment, in order to flexibly select a transform size from among various transform sizes ranging from large to small, splitting to Transform Units (TUs) is expressed in a tree structure. In the tree structure, in order to define nodes up to nodes at the ends (leaf nodes), transform unit split information (TUS: split_transform_flag) that is flag information indicating whether or not TU splitting is to be performed is coded.

Figure 4A:
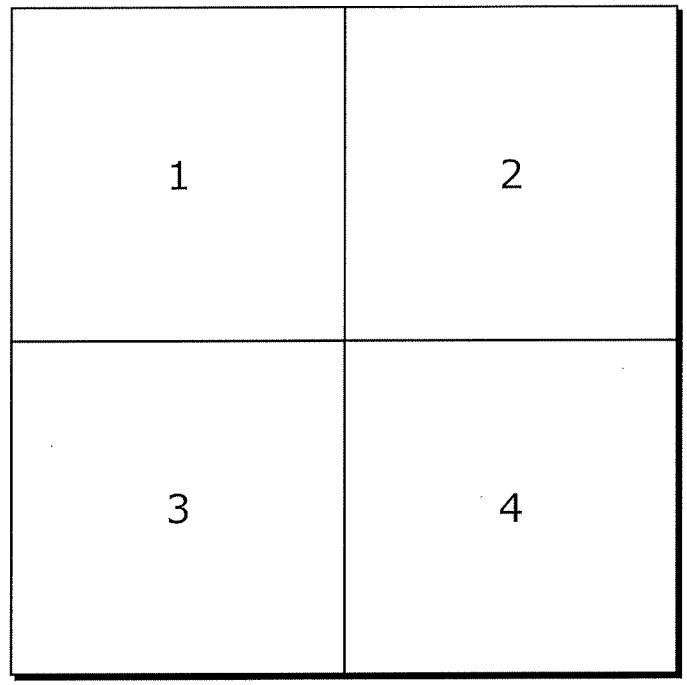
FIG. 4A is a diagram showing an example of a TU according to Embodiment 1.
Figure 4B:
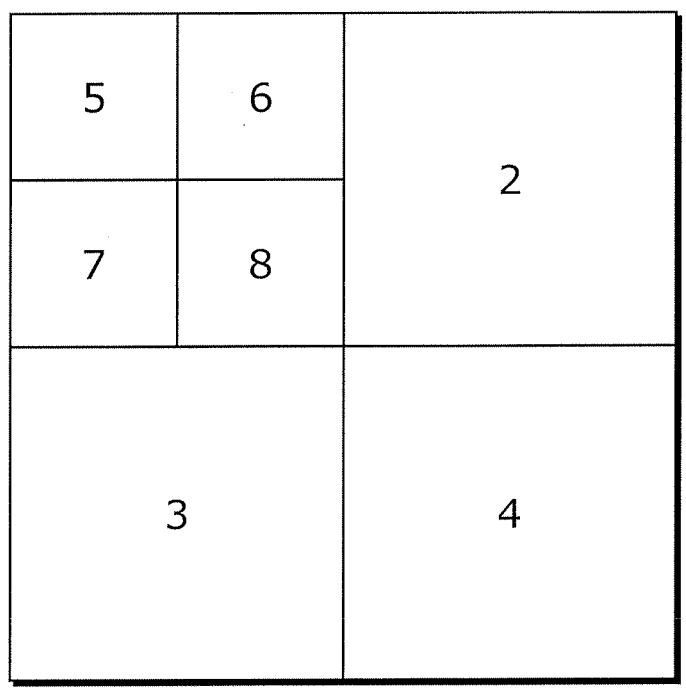
FIG. 4B is a diagram showing an example of a TU according to Embodiment 1.

Each of FIGS. 4A and 4B shows an example of TUs. For example, as shown in FIG. 4, a single CU (TU0) can be split into four TUs that are TU1 to TU4. Each of the TU1 to TU4 can be further split into four TUs. For example, in the example shown in FIG. 4B, the TU1 shown in FIG. 4A is further split into four TUs that are TU5 to TU8. As described above, the TU splitting is hierarchically performed.

Figure 5:
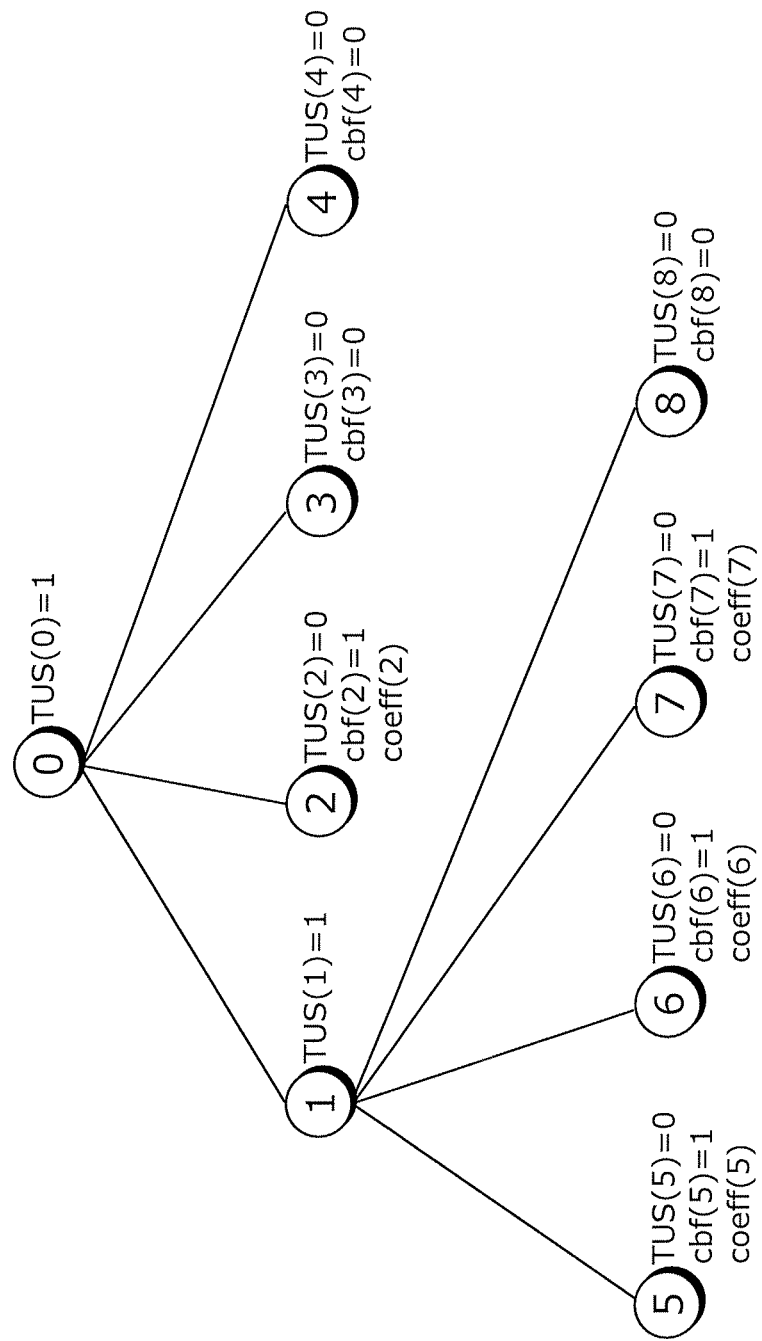
FIG. 5 is a diagram showing an example of a tree structure according to Embodiment 1.

FIG. 5 is a diagram showing a tree structure of the TUs shown in FIG. 4B. As shown in FIG. 5, a root of the tree structure is the CU (TU0). The leaf nodes in the tree structure are the respective split TUs.

Each of the nodes in the tree structure has split information (TUS). In other words, a TUS corresponds to a corresponding one of the nodes in the tree structure, and indicates whether or not a TU corresponding to the node is to be further split. A value "1" of a TUS means that a TU corresponding to the node is to be further split. On the other hand, a value "0" of a TUS means that the TU corresponding to the node is not to be split.

The leaf node indicating a TUS as "0" further has a CBF indicating whether or not there is a transform coefficient (coeff) corresponding to the leaf node. A value "1" of a CBF means that the node has the transform coefficient. On the other hand, a value "0" of a CBF means that the node does not have a transform coefficient. It should be noted that a CBF may be included in nodes except the leaf nodes, which will be described later in more detail. In other words, a CBF corresponds to at least one of nodes in the tree structure, and is the first flag indicating whether there is a quantization coefficient 131 corresponding to the node.

Figure 6:
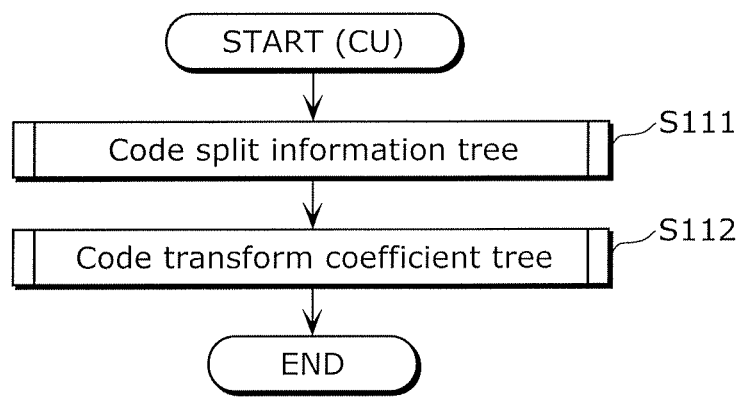
FIG. 6 is a flowchart of coding according to Embodiment 1.

FIG. 6 is a flowchart of an image coding method according to the present embodiment. FIG. 6 shows coding of a single CU.

First, the image coding apparatus 100 (entropy coding unit 190) codes a tree structure (split information tree: transform_split_tree) of TUSs as information indicating which transform size is to be performed on the CU (S111). More specifically, the image coding apparatus 100 codes, in to a tree structure, pieces of management information (TUS and CBF) indicating a structure of a plurality of transform units.

Next, the image coding apparatus 100 codes the tree structure (transform coefficient tree: transform_coeff_tree) of transform coefficients including transform coefficients of respective TUs, according to the transform sizes, the pieces of position information, and CBFs which are expressed in the split information tree (S112). The above-described series of processes are performed on each of CUs.

The use of such tree structure expression can set a size of a transform size spatially or partially in a CU, so as to achieve a maximum coding efficiency depending on features and the like of image. Note that a CBF may be coded at Step S112 not at Step S111.

Figure 7:
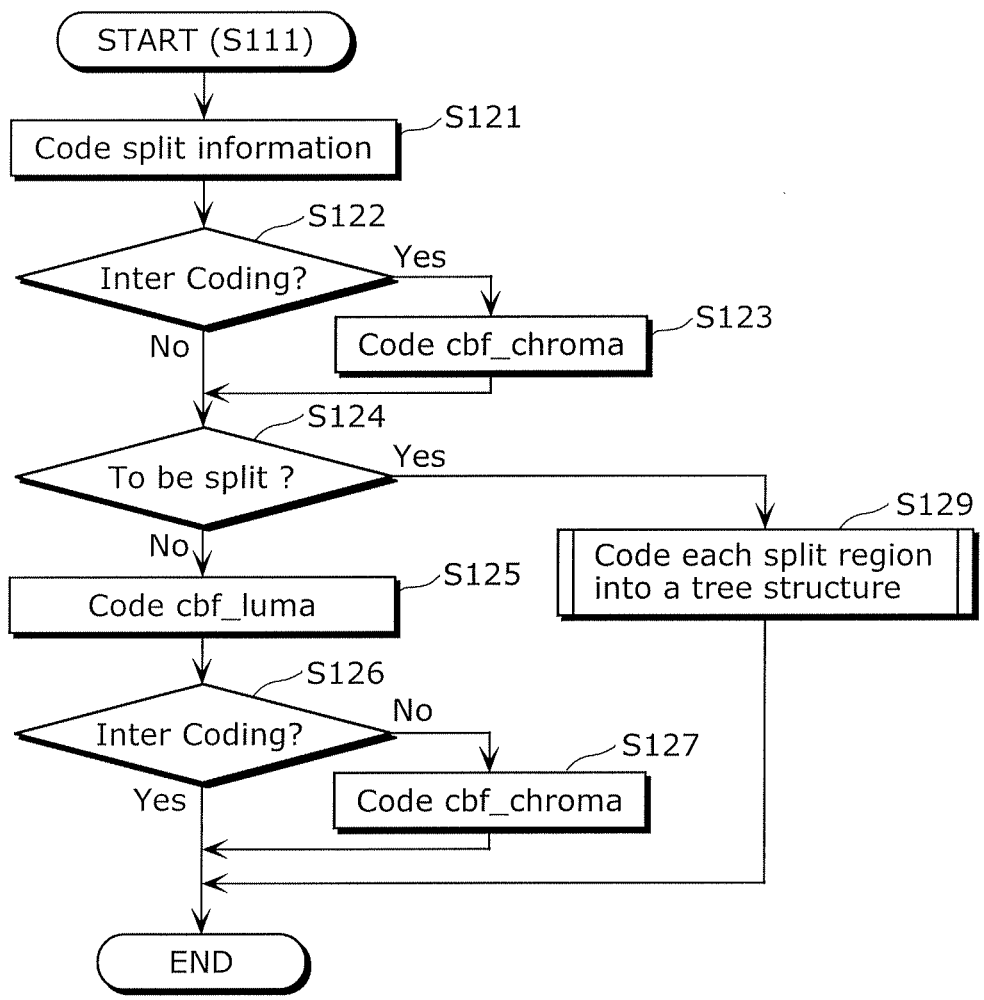
FIG. 7 is a flowchart of coding a split information tree according to Embodiment 1.

The following describes coding (S111) of the split information tree. FIG. 7 is a flowchart of detailed steps in the coding (S111) of a split information tree.

The coding of a split information tree is recursively defined. The recursive level (hierarchy) of the tree structure is called a Transform Depth (TrD).

First, the image coding apparatus 100 codes a TUS of a certain TrD (S121). Next, the image coding apparatus 100 switches processing to another according to the method of generating a prediction signal (S122). For example, if inter prediction (inter-picture prediction) is adopted, a data amount of a transform coefficient of chrominance signal is likely to be zero. Therefore, in the case where inter prediction is adopted (Yes at S122), then the image coding apparatus 100 codes cbf_chroma that is the third flag indicating whether or not a transform coefficient of a block of chrominance signal exists (S123).

Note that TUS may be exchanged with cbf_chroma in the coding order. If cbf_chroma is coded prior to a TUS, the image decoding apparatus 200 obtains TUS information from a coded stream (coded signal 191), so as to minimize a wait time until it is determined (S124) based on the TUS whether or not next splitting is to be performed. Thereby, if a TUS is stored in a high-speed cash memory or the like, it is possible to reduce a memory amount and increase a processing speed.

Referring back to FIG. 7, the description continues. Next, the image coding apparatus 100 determines based on the TUS whether or not a current TU is to be further split into pieces (S124). If the TU is to be split (Yes at S124), then the image coding apparatus 100 spatially splits the TU into four regions, and recursively codes the split information tree for the split regions (S129). In other words, the image coding apparatus 100 performs the processing (S111) shown in FIG. 7 on each of the split four TUs.

On the other hand, if the TU is not to be split (No at S124), then the image coding apparatus 100 codes cbf_luma that is the second flag indicating whether or not a transform coefficient of luminance signal of the current TU exists (S125).

Next, the image coding apparatus 100 determines whether or not the prediction method used for the TU (CU) is inter prediction (S126). If the inter prediction is used (Yes at S126), then the image coding apparatus 100 terminates the coding (S111) of the split information tree for the current node. On the other hand, if the inter prediction is not adopted (for example, intra prediction (intra-picture prediction) is adopted) (No at S126), then the image coding apparatus 100 codes cbf_chroma (S127), and terminates the coding (S111) of the split information tree for the node. If the above-described processing is recursive processing for a lower level in the hierarchy, the processing shifts to another processing for an upper level of a recursive call (a parent node of the current node in the tree structure).

Then, if transform sizes and CBFs are expressed for all of the regions in the CU, the coding (S111) of the split information tree is completed.

Figure 8:
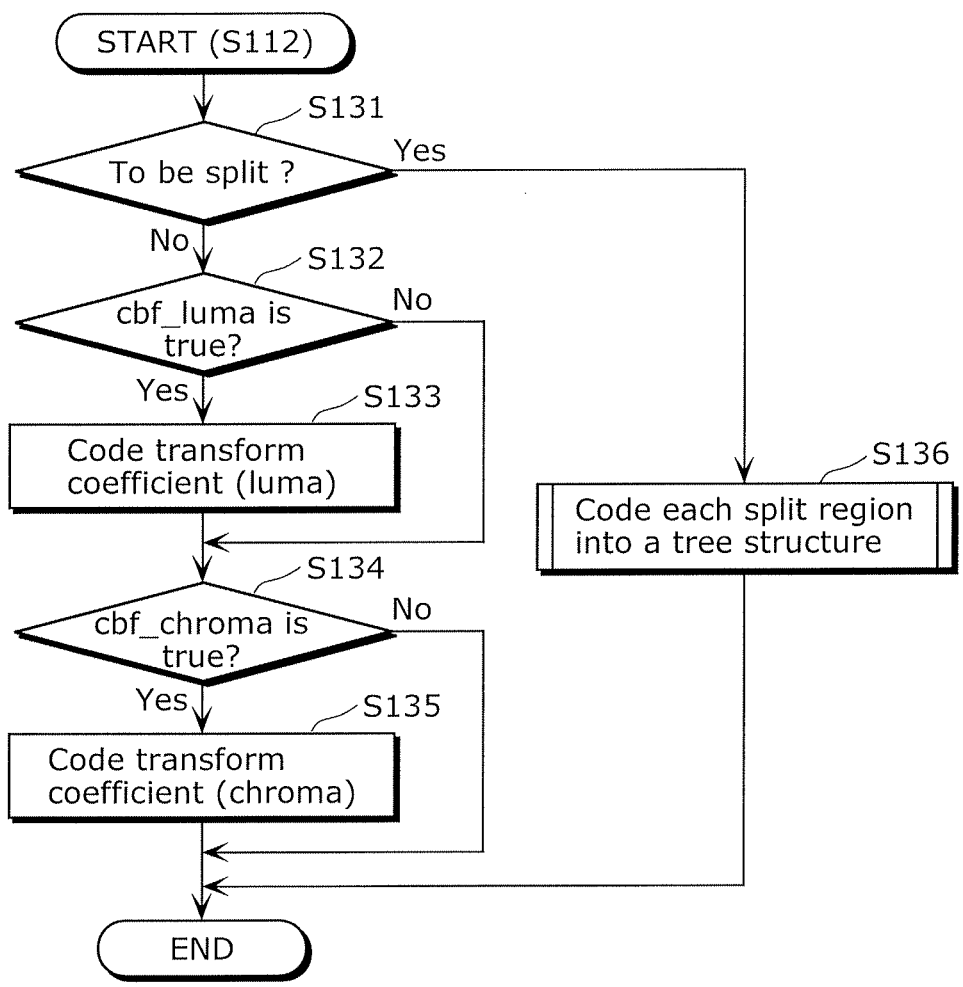
FIG. 8 is a flowchart of coding a transform coefficient tree according to Embodiment 1.

Next, the coding (S112) of a transform coefficient tree is described. FIG. 8 is a flowchart of the coding (S112) of a transform coefficient tree.

The coding of a split information tree is recursively defined. The processing for coding a transform coefficient tree at a certain recursive level depends on whether a previously coded TUS is true or false (S131). If a TUS is true (Yes at S131), then the image coding apparatus 100 splits the TU into four pieces, and recursively codes the transform coefficient tree for the split regions (S136).

On the other hand, if the TU is not to be split (No at S131), then the processing is changed according to whether a previously coded cbf_luma is true or false (S132). If cbf_luma is true (Yes at S132), then the image coding apparatus 100 codes a transform coefficient of luminance signal of the TU (S133). On the other hand, if cbf_luma is false (No at S132), then the image coding apparatus 100 does not code the transform coefficient of the luminance signal of the TU.

Next, the processing is changed depending on a previously coded cbf_chroma (S134). If cbf_chroma is true (Yes at S134), then the image coding apparatus 100 codes a transform coefficient of chrominance signal of the current CU (S135). On the other hand, if cbf_chroma is false (No at S134), then the image coding apparatus 100 does not code the transform coefficient of the chrominance signal of the current TU.

As described above, the processing for a certain leaf node is completed. If the above-described processing is recursive processing for a lower level, the processing shifts to another processing for an upper level of a recursive call (a parent node of the current node in the tree structure).

Then, when traverse (search or circuit) of the TUS tree structure is completed for all of the regions in the current CU and therefore transform coefficients of TUs each having a CBF that is true have been coded, the coding (S112) of a transform coefficient tree is completed.

Note that, in the flow described with reference to FIGS. 6, 7, and 8, if "coding" is replaced by "decoding", a flow of decoding performed by the image decoding apparatus 200 (entropy decoding unit 290) can be obtained.

Note also that the above-described procedure is not only the procedure for coding or decoding, but also the order of arranging data of the coded signal 191. More specifically, in the coded signal 191, pieces of coded data (TUS, CBF, and transform coefficient) are arranged in the same order as the above-described procedure. The same goes for the subsequent embodiments.

Figure 9:
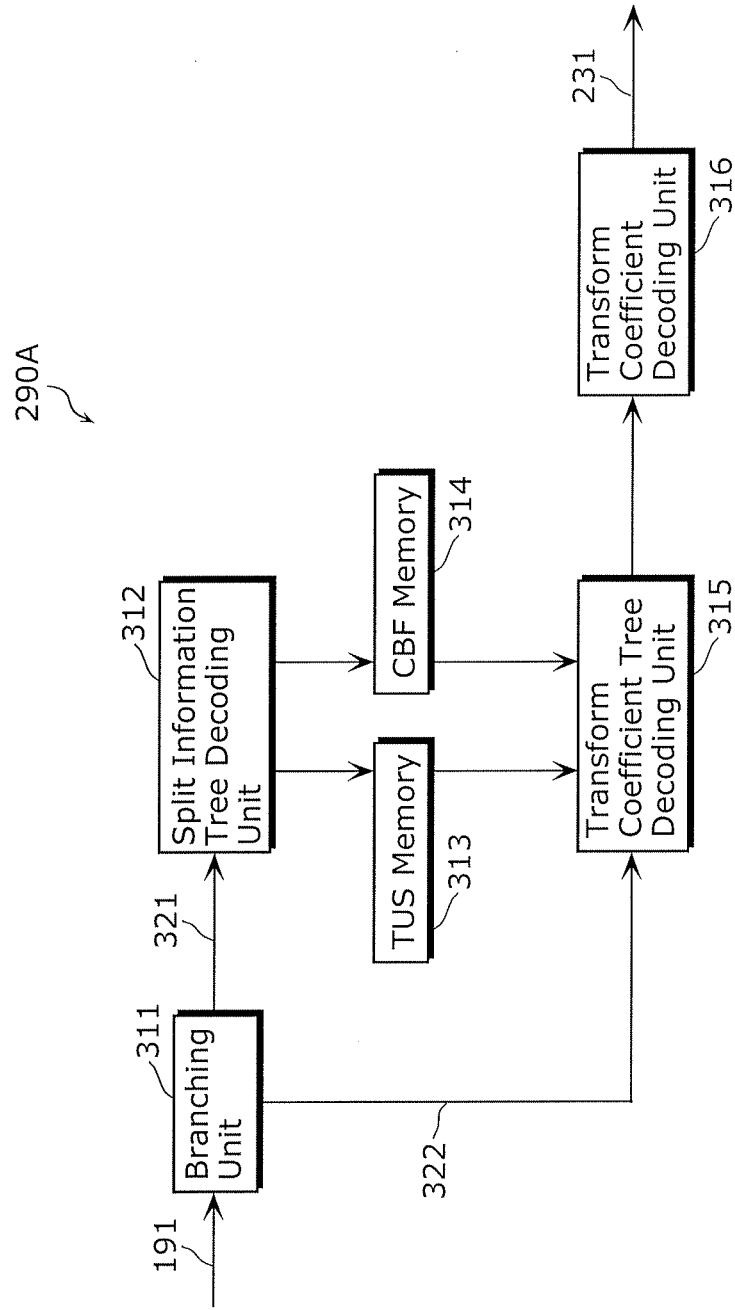
FIG. 9 is a block diagram of an entropy decoding unit according to Embodiment 1.

FIG. 9 is a block diagram of an entropy decoding unit 290A that is an example of the entropy decoding unit 290 included in the image decoding apparatus 200. The entropy decoding unit 290A includes a branching unit 311, a split information tree decoding unit 312, a TUS memory 313, a CBF memory 314, a transform coefficient tree decoding unit 315, and a transform coefficient decoding unit 316.

The branching unit 311 (DeMux unit) selectively outputs a signal according to a type of the coded signal 191. More specifically, the branching unit 311 provides the split information tree decoding unit 312 with coded management information 321 included in the coded signal 191. The coded management information 321 includes a coded TUS and a coded CBF.

The split information tree decoding unit 312 decodes the coded management information 321 to obtain the TUS and the CBF. The TUS is stored in the TUS memory 313 that is a temporary memory. In other words, all of TUSs in a current CU are temporarily stored in the TUS memory 313. In addition, the CBF is stored into the CBF memory 314 that is a temporary memory. In other words, all CBFs in a current CU are temporarily stored in the CBF memory 314.

After a TUS and a CBF have been decoded, the branching unit 311 provides the transform coefficient tree decoding unit 315 with the coded transform coefficient 322 included in the coded signal 191.

The transform coefficient tree decoding unit 315 reads a TUS from the TUS memory 313, and searches the tree structure for a node according to the TUS. Then, the transform coefficient tree decoding unit 315 reads a CBF of the corresponding node from the CBF memory 314, and associates the coded transform coefficient with a transform unit having a CBF that is true.

The transform coefficient decoding unit 316 performs entropy decoding on the coded transform coefficient 322 for each TU, thereby generating a transform coefficient (quantization coefficient 231).

As described above, each of the image coding apparatus 100 and the image decoding apparatus 200 according to the present embodiment uses the management information having the tree structure, thereby reducing an overhead of the management information. In other words, each of the image coding apparatus 100 and the image decoding apparatus 200 can suppress increase of information indicating a structure of transform units, and also increase a flexibility in selecting a transform size.

Furthermore, each of the image coding apparatus 100 and the image decoding apparatus 200 uses two tree structures that are a split information tree and a transform coefficient tree. As described above, it is possible to independently perform processing speed optimization and the like for each of the tree structures.

Embodiment 2

In Embodiment 1, the two tree structures are used. In Embodiment 2, however, one tree structure is used to code management information and transform coefficients.

Figure 10A:
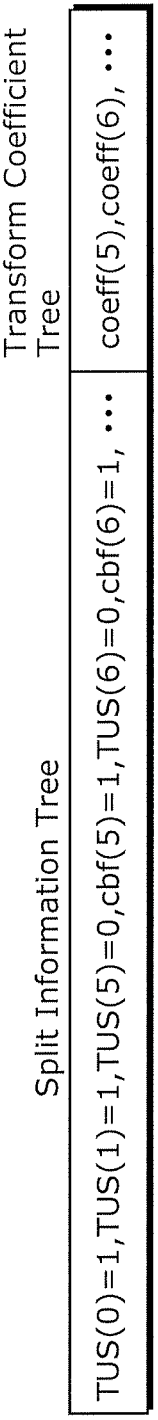
FIG. 10A is a diagram showing an example of coded signals according to Embodiment 1.
Figure 10B:
FIG. 10B is a diagram showing an example of coded signals according to Embodiment 2.

The following describes a difference between the previously-described Embodiment 1 and Embodiment 2, with reference to FIGS. 10A and 10B. FIG. 10A is a diagram showing an arrangement of coded management information and coded transform coefficients which are included in a coded signal 191 according to Embodiment 1 FIG. 10B is a diagram showing an arrangement of coded management information and coded transform coefficients which are included in a coded signal 191 according to Embodiment 2. The data shown in each of FIGS. 10A and 10B corresponds to the tree structure shown in FIG. 5.

As shown in FIG. 10A, according to Embodiment 1, pieces of management information included in a division information tree are arranged in succession, and transform coefficients included in a transform coefficient tree are arranged in another group. In other words, management information and a transform coefficient of the same TU are arranged in separated positions. Therefore, it is necessary to temporarily store, into the memory, management information which is decoded prior to a transform coefficient.

According to Embodiment 2, on the other hand, a single tree structure is used to arrange both management information and a transform coefficient are arranged in succession for each of leaf nodes in the tree structure. Therefore, it is possible to reduce a data amount to be temporarily stored in the memory.

The following describes a coding method according to the present embodiment. In the following description, the difference from Embodiment 1 is mainly described and the overlapping explanation is not given. Furthermore, the same reference numerals are assigned to the identical elements and steps in the drawings.

Figure 11:
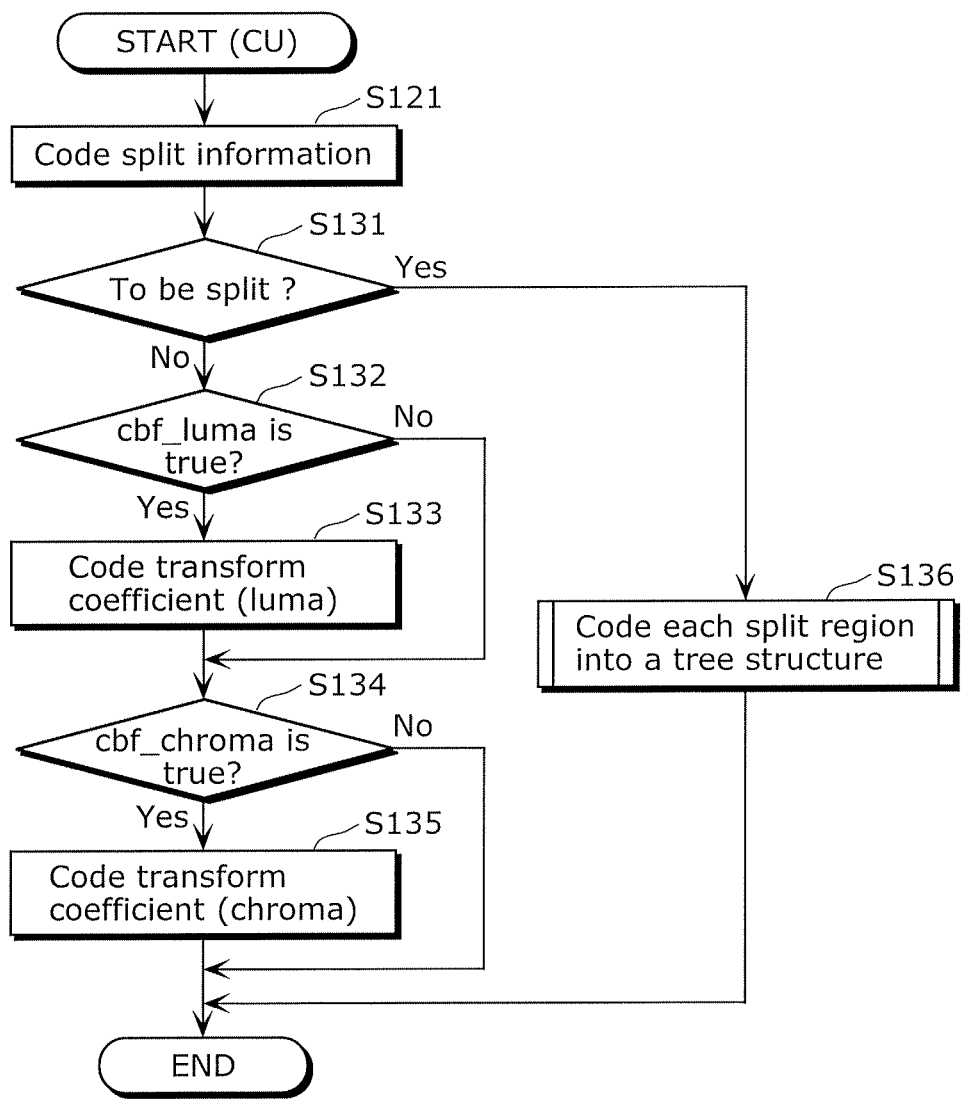
FIG. 11 is a flowchart of coding according to Embodiment 2.

FIG. 11 is a flowchart of coding performed by the image coding apparatus 100 according to the present embodiment. The image coding apparatus 100 codes management information (TUS and CBF) and a transform coefficient by using a single transform unified tree.

First, the image coding apparatus 100 codes a TUS of a certain TrD (S121). Next, the processing is changed to another according to the TUS (S131). If the TUS is true (Yes at S131), then the image coding apparatus 100 spatially splits the TU into four regions, and recursively codes a transform unified tree for the split regions (S141).

On the other hand, if the TUS is false (No at S131), then the image coding apparatus 100 does not split the TU. In other words, the node is a leaf node. Here, the processing is changed to another according to whether cbf_luma coded in the transform unified tree is true or false (S132).

If cbf_luma is true (Yes at S132), then the image coding apparatus 100 codes a transform coefficient of luminance signal of the current TU (S133). On the other hand, if cbf_luma is false (No at S132), then the image coding apparatus 100 does not code the transform coefficient of the luminance signal of the TU.

Next, the processing is changed according to whether cbf_chroma is true or false (S134). If cbf_chroma is true (Yes at S134), then the image coding apparatus 100 codes a transform coefficient of chrominance signal of the current CU (S135). On the other hand, if cbf_chroma is false (No at S134), then the image coding apparatus 100 does not code the transform coefficient of the chrominance signal of the current TU.

As described above, the processing for a certain leaf node is completed. If the above-described processing is recursive processing for a lower level in the hierarchy, the processing shifts to processing for an upper level of a recursive call (a parent node of the current node in the tree structure).

Then, if transform sizes, CBFs, and the like of all of the regions in the current CU and the transform coefficients are coded, the coding of the transform unified tree is completed.

Embodiment 2 differs from Embodiment 1 in that the tree structure includes pieces of management information and transform coefficients at the leaf nodes. Embodiment 1 needs two processes for the tree structures, which are coding of the two tree structures (split information tree and transform coefficient tree) and traverse of the tree structures. Embodiment 2, on the other hand, needs one process for the tree structure in the coding method. Therefore, Embodiment 2 can reduce steps included in the image coding apparatus, the image decoding apparatus, the image coding method, and the image decoding method.

As described above, according to the present embodiment, the image coding apparatus 100 codes, into a single tree structure, pieces of management information and quantization coefficients 131 which indicate a structure of a plurality of TUs. Here, each of the TUs corresponds to a corresponding one of the leaf nodes in the tree structure. In addition, the image coding apparatus 100 codes, for each of the leaf nodes, management information and a quantization coefficient 131 which correspond to the leaf node, and generates a coded signal 191 in which the coded management information and the coded quantization coefficient are arranged in succession.

Moreover, the image decoding apparatus 200 decodes the coded signal 191 to obtain respective quantization coefficients 231 of the TUs and pieces of management information (TUS and CBF) indicating the structure of the TUs. Here, the pieces of management information and the quantization coefficients 231 form a single tree structure. Here, each of the TUs corresponds to a corresponding one of the leaf nodes in the tree structure. Then, for the coded signal 191, the image decoding apparatus 200 decodes, for each of the leaf nodes, a coded management information and a coded quantization coefficients which are arranged in succession for the leaf node.

Figure 12A:
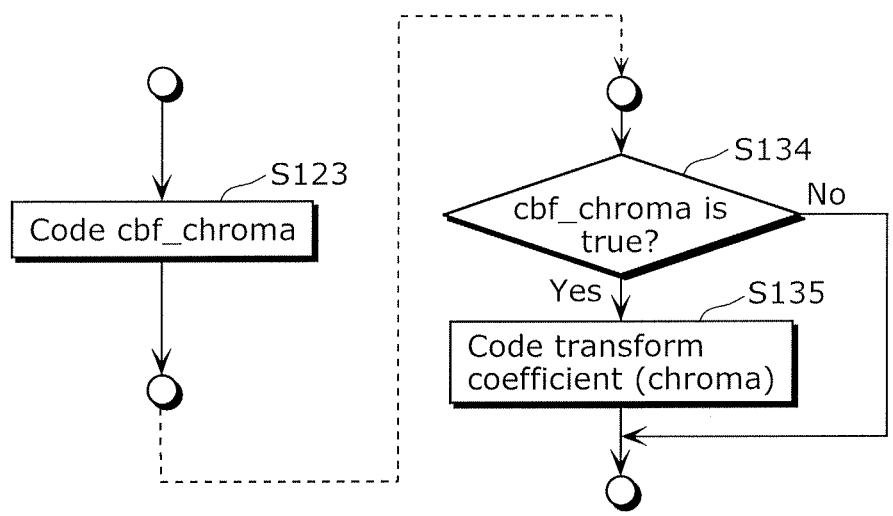
FIG. 12A is a flowchart of a part of coding according to Embodiment 2.
Figure 12B:
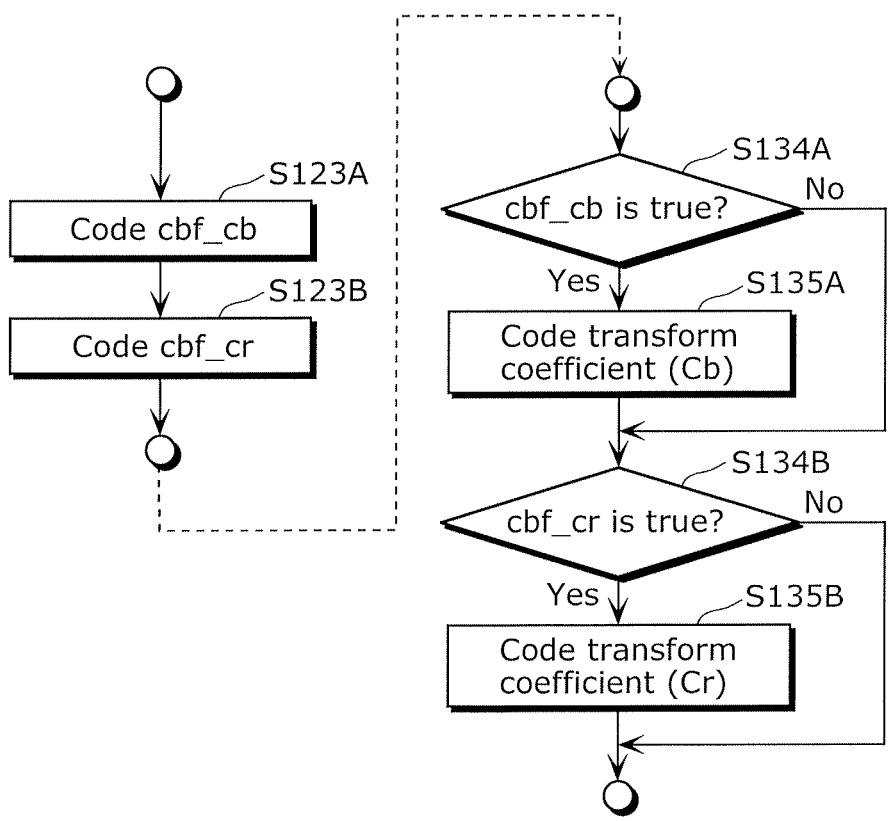
FIG. 12B is a flowchart of a part of coding according to Embodiment 2.

Each of FIGS. 12A and 12B is a flowchart of processing performed on a CBF and a transform coefficient of chrominance signal. The processing shown in each of FIGS. 12A and 12B is included in the flowchart of FIG. 11.

The image coding apparatus 100 codes cbf_chroma at a certain stage in the transform unified tree (S123). If cbf_chroma is true (Yes at S134), then the image coding apparatus 100 codes a transform coefficient of chrominance signal of the current CU (S135).

For the sake of simplicity in the description, Cb and Cr of chrominance are not distinguished from each other in FIG. 12A. In practice, Cb is distinguished from Cr as shown in FIG. 12B.

As shown in FIG. 12B, at a certain stage in the transform unified tree, the image coding apparatus 100 codes cbf_cb that is the third flag indicating whether there is a transform coefficient of chrominance Cb (S123A). In addition, at a certain stage in the transform unified tree, the image coding apparatus 100 codes cbf_cr that is the fourth flag indicating whether or not there is a transform coefficient of chrominance Cr (S123B). After that, if cbf_cb is true (Yes at S134A), then the image coding apparatus 100 codes the transform coefficient of the chrominance Cb of the current CU (S135A). On the other hand, if cbf_cr is true (Yes at S134B), then the image coding apparatus 100 codes the transform coefficient of the chrominance Cr of the current TU (S135B).

Figure 13:
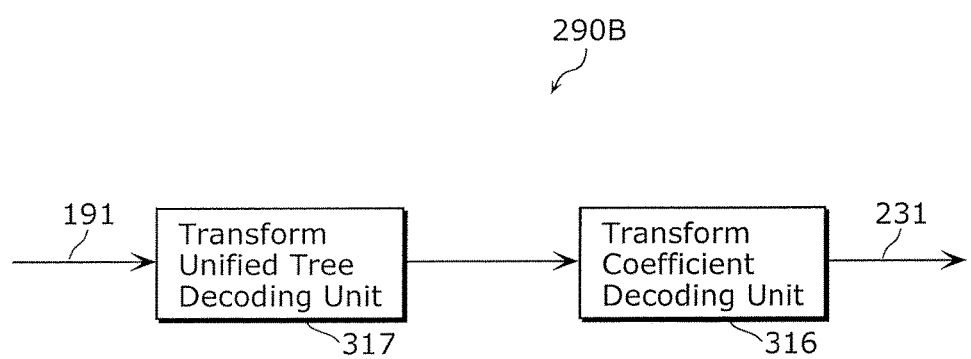
FIG. 13 is a block diagram of an entropy decoding unit according to Embodiment 2.

FIG. 13 is a block diagram of an entropy decoding unit 290B that is an example of the entropy decoding unit 290 included in the image decoding apparatus 200 according to Embodiment 2. The entropy decoding unit 290B includes a transform unified tree decoding unit 317 and a transform coefficient decoding unit 316.

From among the coded signal 191, the coded TUS, CBF, and transform coefficient, namely, the coded signals included in the transform unified tree, are provided to the transform unified tree decoding unit 317. The transform unified tree decoding unit 317 decodes a TU transform unit size and a position according to the TUS tree structure. In addition, the transform unified tree decoding unit 317 decodes a CBF as needed, and outputs a coded transform coefficient of a TU if the CBF is true.

The transform coefficient decoding unit 316 performs entropy decoding on the coded transform coefficient provided from the transform unified tree decoding unit 317, thereby generating a transform coefficient (quantization coefficient 231).

The entropy decoding unit 290B shown in FIG. 13 differs from the entropy decoding unit 290A shown in FIG. 9 in that the TUS memory 313 and the CBF memory 314 are not required. As described above, the image decoding apparatus 200 according to the present embodiment can reduce a memory size.

Note that the image coding apparatus 100 can eliminate coding of flags such as cbf_chroma, cbf_luma, cbf_cb, and cbf_cr under certain conditions. It is thereby possible to reduce a data amount of the coded signal 191. The following describes the processing with reference to FIGS. 14A to 14D.

FIG. 14A is a diagram for explaining a normal case where a CBF flag is coded for each of four split regions. FIG. 14B is a diagram of one example where coding is eliminated. Here, it is known that any of these four blocks has a transform coefficient. In this case, if CBFs of blocks at the upper left, at the upper right, and at the lower left are all "0", then a CBF of a block at the lower right should be "1". This is apparent without reference to a CBF flag of the block at the lower right. Therefore, coding of the CBF flag of the block at the lower right can be eliminated.

FIG. 14C is a diagram of another example, showing four blocks at a certain TrD=d and a block TrD=d−1 at a level that is upper than the level of the four blocks. If a CBF is "1" for the upper-level block TrD=d−1, at least one of the blocks TrD=d that are generated by splitting the upper-hierarchy block and are at a lower level has a transform coefficient. In other words, in this case, one of the blocks at the lower level TrD=d has a CBF=1. In this case, like the above case, if CBFs of blocks at the upper left, at the upper right, and at the lower left are all "0", then a CBF of a block at the lower right should be "1". Therefore, coding of the CBF of the block at the lower right can be eliminated.

Likewise, FIG. 14D is a diagram showing an example where cbf_chroma is first coded to cause cbf_luma to depend on the coded cbf_chroma. For cbf_luma of the four blocks at TrD=d, if pieces of cbf_luma of all blocks at the upper left, at the upper right, and at the lower left are "0" and pieces of cbf_chroma (cbf_cb and cbf_cr) of two blocks at an upper level are "0", it is sure that cbf_luma of the last block is "1". Therefore, coding of cbf_luma of the block can be eliminated.

As described above, there is a case where a CBF flag can be eliminated. In the present embodiment, it is possible to combine eliminations under such conditions in coding or decoding a CBF flag.

As described above, the image coding apparatus 100 determines whether or not a value of a CBF flag of a current node at a current level can be uniquely identified by at least one of (a) a CBF flag at an upper level and (b) CBF flags of different nodes at the current level. If the value of the CBF flag of the current node can be uniquely identified, the CBF flag of the current node is not coded. Furthermore, the image decoding apparatus 200 determines whether or not a value of a CBF of a current node at a current level can be uniquely identified by at least one of (a) a CBF flag at an upper level and (b) CBF flags of different nodes at the current level. If the value of the CBF of the current node can be uniquely identified, the CBF flag of the current node is not decoded.

Thus, the image coding apparatus 100 according to the present embodiment codes (a) management information indicating a size of a transform unit, a position, and the like and (b) a transform coefficient into a single tree structure. The image coding apparatus 100 and the image decoding apparatus 200 can thereby reduce a data amount in a used memory and reduce steps in processing.

Note that, in the flow described with reference to FIGS. 11, 12A, and 12B, if "coding" is replaced by "decoding", a flow of decoding performed by the image decoding apparatus 200 (entropy decoding unit 290B) can be obtained.

Embodiment 3

Embodiment 3 is a variation of the above-described Embodiment 2.

FIG. 15 is a flowchart of coding according to the present embodiment. The same reference numerals in FIG. 11 are assigned to the identical steps in FIG. 15, and therefore differences between FIG. 11 and FIG. 15 are mainly described.

After Step S121, the image coding apparatus 100 determines processing according to a method of generating a prediction signal (S122). More specifically, if inter prediction is adopted (Yes at S122), then the image coding apparatus 100 codes cbf_chroma (S123).

Next, the image coding apparatus 100 determines based on a TUS whether or not a current TU is to be further split into pieces (S124). If the TU is to be split (Yes at S124), then the image coding apparatus 100 spatially split the TU into four regions, and recursively codes a transform unified tree for the split regions (S141).

On the other hand, if the TU is not to be split (No at S124), then the image coding apparatus 100 codes cbf_luma (S125). Next, the image coding apparatus 100 determines whether or not the prediction method used for the TU (CU) is inter prediction (S126). If inter prediction is not used (for example, if intra prediction is adopted) (No at S126), then the image coding apparatus 100 codes cbf_chroma (S127). The processing from Step S132 is the same as the processing in FIG. 11.

As described above, in the image coding method according to the present embodiment, if inter prediction is adopted for a current CU, then cbf_chroma at the highest level of hierarchy is coded, and if the intra prediction is adopted, cbf_chroma at a leaf node is coded.

Here, inter prediction is unlikely to cause a transform coefficient. In particular, inter prediction is unlikely to cause a transform coefficient of chrominance signal. Therefore, if inter prediction is adopted, coding of cbf_chroma prior to TU splitting is more efficient than coding of cbf_chroma after TU splitting. On the other hand, intra prediction is likely to cause a transform coefficient. Therefore, coding prior to TU splitting produces little improvement of a coding efficiency. Therefore, the image coding apparatus 100 codes cbf_chroma at leaf nodes after TU splitting.

Thus, the image coding apparatus 100 according to the present embodiment can reduce a data amount of CBFs.

Note that, in the flow described with reference to FIG. 15, if "coding" is replaced by "decoding", a flow of decoding performed by the image decoding apparatus 200 can be obtained.

Embodiment 4

Embodiment 4 is a variation of the above-described Embodiment 3.

Figure 16:
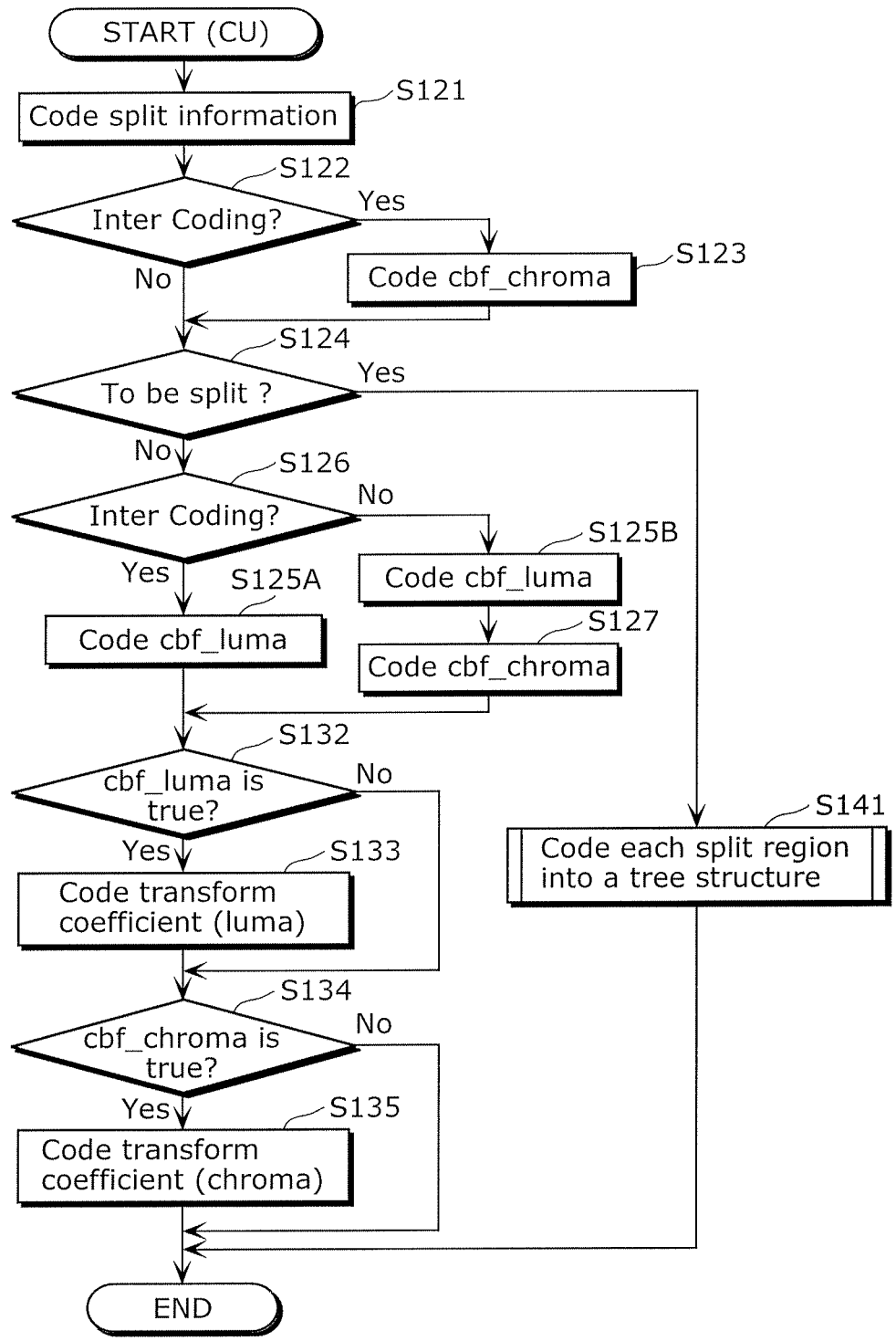
FIG. 16 is a flowchart of coding according to Embodiment 4.

FIG. 16 is a flowchart of coding according to the present embodiment. The same reference numerals in FIG. 15 are assigned to the identical steps in FIG. 16, and therefore differences between FIG. 15 and FIG. 16 are mainly described.

As described in Embodiment 3, a tendency of having a transform coefficient and the like heavily depends on whether a prediction method is inter prediction or non-inter prediction (intra prediction). In particular, if intra prediction is adopted, a great number of intra predictions and transforms are necessary for small blocks. In order to address this, decrease of steps in intra prediction is particularly important. Therefore, according to the present embodiment, processing is selected at an upper level of hierarchy based on whether a prediction method is inter prediction or intra prediction (non-inter prediction). As a result, the processing in the case of inter prediction is separated from the processing in the case of intra prediction. Thereby, it is easy to optimize implementation.

More specifically, as shown in FIG. 16, at the leaf nodes, cbf_luma is coded after the determination (S126) as to whether the prediction method is inter prediction or non-inter prediction. More specifically, if inter prediction is not adopted (No at S126), then the image coding apparatus 100 codes cbf_luma (S125B), and codes cbf_chroma (S127). On the other hand, if inter prediction is adopted (Yes at S127), then the image coding apparatus 100 codes cbf_luma (S125A). The processing from Step S132 is the same as the processing in FIG. 11.

The processing for CBF is likely to be complicated with the case where flags are eliminated. On the other hand, if processing for CBF is switched depending on whether a prediction method is inter prediction or intra prediction as described above, the same effects as described above can be produced.

Figure 17:
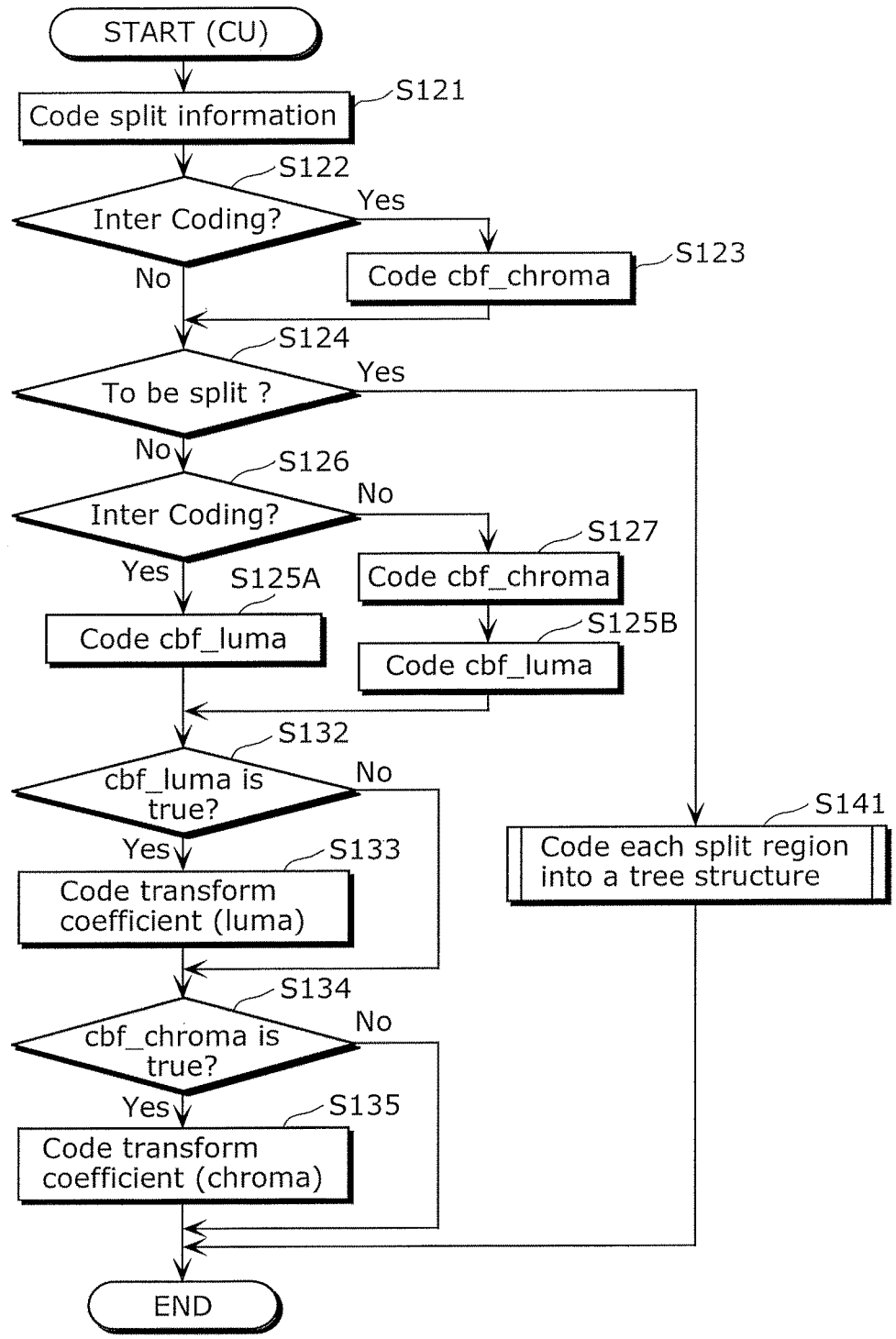
FIG. 17 is a flowchart of another coding according to Embodiment 4.

As shown in FIG. 17, it is also possible that, if intra prediction is adopted (No at S126), then the image coding apparatus 100 codes cbf_chroma (S127), and then codes cbf_luma (S125B). Thereby, an order of coding cbf_chroma and cbf_luma is the same between the case using inter prediction (S123, S125A) and the case using inter prediction (S127 and S125B). As described above, communalizing the processing order can reduce a data amount of a processing program.

Note that, in the flow described with reference to FIGS. 16 and 17, if "coding" is replaced by "decoding", a flow of decoding performed by the image decoding apparatus 200 can be obtained.

Embodiment 5

In Embodiment 5, an order of coding CBFs and transform coefficients is described.

Each of FIGS. 18A to 18C shows an order of coding CBFs and transform coefficients (BlockCoeff). In other words, each of FIGS. 18A to 18C shows an arrangement of CBFs and transform coefficients in a coded signal 191. In FIGS. 18A to 18C, each numeral value indicates a coding order. In each of FIGS. 18A to 18C, the number of transform blocks of luma (luminance signal) is equal to the number of transform blocks of chroma (chrominance signal).

The coding order shown in FIG. 18A is, for instance, one example of the coding order according to Embodiment 1. In FIG. 18A, cbf_luma (Blk=0), cbf_cb (Blk=0), and cbf_cr (Blk=0) are coded in order, and then cbf_luma (Blk=1), cbf_cb (Blk=1), cbf_cr (Blk=1), cbf_luma (Blk=2), cbf_cb (Blk=2), cbf_cr (Blk=2), cbf_luma (Blk=3), cbf_cb (Blk=3), cbf_cr (Blk=3) are coded in order. Here, each Blk value indicates a spatial position of a corresponding block in a Z order. Blk=0 indicates a block at the upper left, Blk=1 indicates a block at the upper right, Blk=2 indicates a block at the lower left, and Blk=3 indicates a block at the lower, right.

Subsequent to coding all of the CBFs, BlockCoeff (luma, Blk=0), BlockCoeff (cb, Blk=0), and BlockCoeff (cr, Blk=0) are coded in order. Next, BlockCoeff (luma, Blk=1), Block-Coeff (cb, Blk=1), and BlockCoeff (cr, Blk=1) are coded in order.

The coding order shown in FIG. 18B is, for instance, one example of the coding order according to Embodiments 2 to 4. CBFs and transform coefficients are coded in the same tree structure. Therefore, a transform coefficient at a certain position is coded relatively immediately after coding a corresponding CBF.

For example, first, cbf_luma (blk=0), cbf_cb (blk=0), and cbf_cr (blk=0) are coded in order, and after that, BlockCoeff (luma, Blk=0), BlockCoeff (cb, Blk=0), and BlockCoeff (cr, Blk=0), which correspond to the above CBFs respectively, are coded in order. Thereby, the image decoding apparatus 200 can reduce a memory size for temporarily storing the CBF flags. In the image coding apparatus 100, BlockCoeff cannot be stored in a stream until CBFs of all blocks are determined. Therefore, there is a problem that a memory size is large enough to store all BlockCoeff of blocks prior to a current block in the block order. This problem is reduced by using the processing order shown in FIG. 18B.

In FIG. 18C, immediately after coding a CBF flag, a corresponding transform coefficient is coded. In this example, a size of a memory for temporarily storing CBFs and transform coefficients is further reduced in comparison to the case shown in FIG. 18B. More specifically, cbf_luma (blk=0), BlockCoeff (luma, Blk=0), cbf_cb (blk=0), Block-Coeff (cb, Blk=0), cbf_cr (blk=0), BlockCoeff (cr, Blk=0), . . . are coded in order.

Next, the description is given for a coding order in the case where the number of transform blocks of chrominance signal is less than the number of transform blocks of luminance signal. Each of FIGS. 19A and 19B shows an example of the coding order in the above case.

For example, at a 4:2:0 format, the number of pixels of chrominance signal is a half of the number of pixels of luminance signal, in a view of a horizontal or vertical line of pixels. For the transform size or an inverse transform size, a minimum size (MinTrafoSize) is defined. More specifically, in the minimum size (Transform Size=MinTrafoSize), there is a case where four TUs can be used for luminance signal, but only one TU is allowed for chrominance signal.

Figure 19A:
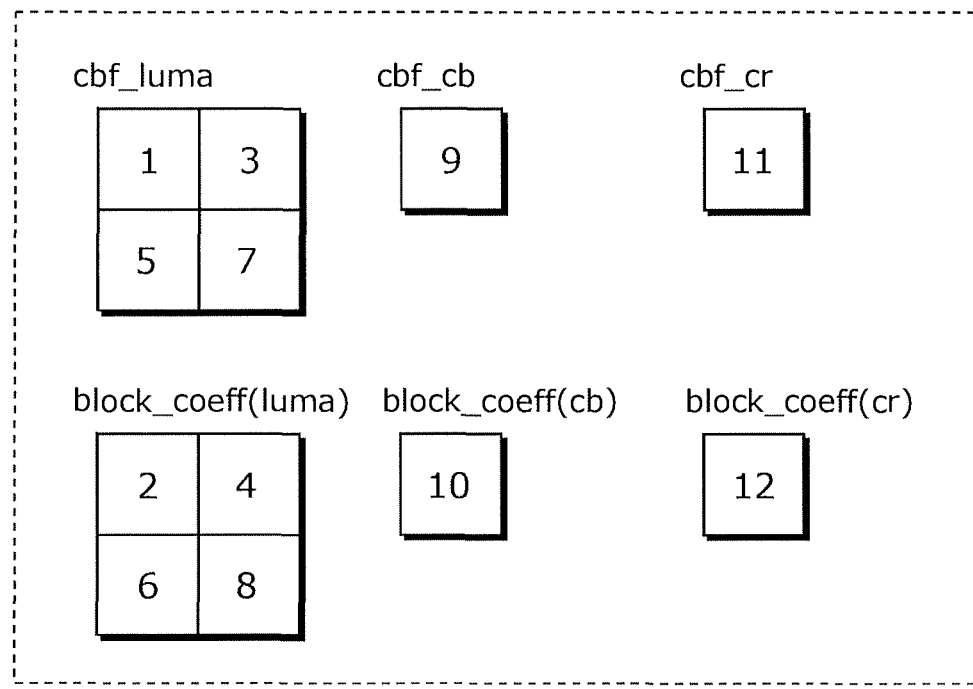
FIG. 19A is a diagram showing an example of an order of coding CBFs and transform coefficients according to Embodiment 5.

In FIG. 19A, a transform coefficient is coded immediately after coding a CBF. Blocks are sequentially coded in an order of having a smaller BlkIdx. The coding order has advantages of reducing a size of a temporary memory because a CBF and a corresponding transform coefficient are close to each other in the coding order.

Figure 19B:
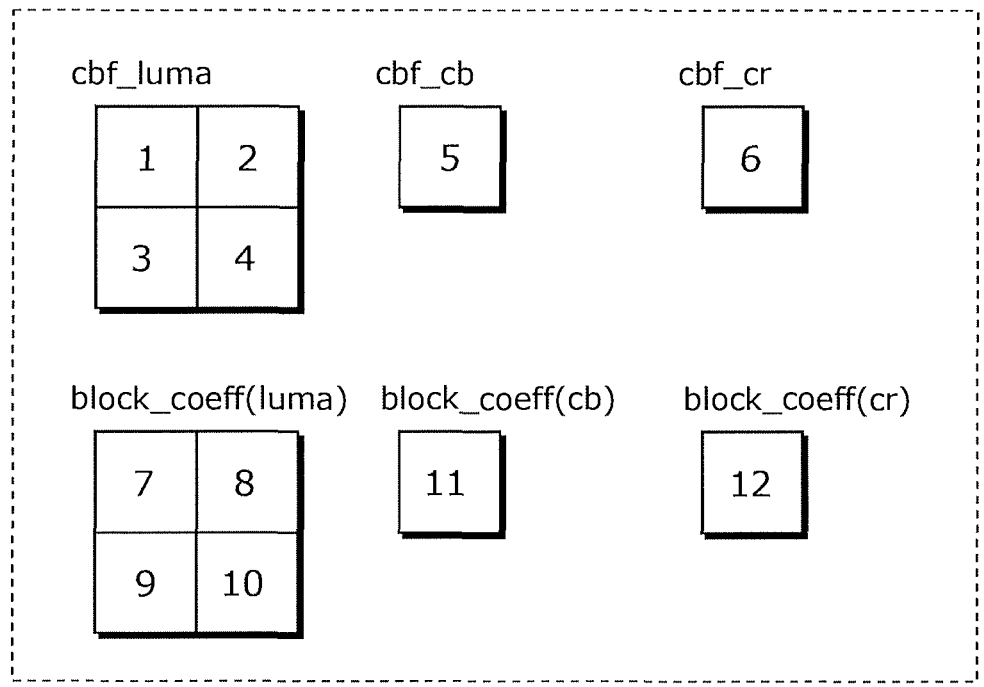
FIG. 19B is a diagram showing an example of an order of coding CBFs and transform coefficients according to Embodiment 5.

In FIG. 19B, first, CBFs and transform coefficients of luminance signal are coded, and then CBFs and transform coefficients of chrominance signal are coded. This coding method has advantages of minimizing processes between luminance signal and chrominance signal and also minimizing switch processes of a data input/output pointer. Prediction processing and data storing destination are sometimes considerably different between luminance signal and chrominance signal. Therefore, it is desirable to continuously perform processes for blocks of luminance signal, and then continuously perform processes for blocks of chrominance signal. Here, the blocks of chrominance signal are coded after coding all of the blocks of luminance signal. However, the same effects can be produced also when the blocks of chrominance signal are coded before coding all of the blocks of luminance signal.

In FIG. 19B, cbf_luma (upper left), BlockCoeff_luma (upper left), cbf_luma (upper right), BlockCoeff_luma (upper right), cbf_luma (lower left), BlockCoeff_luma (lower left), cbf_luma (lower right), BlockCoeff_luma (lower right), cbf_cb, BlockCoeff_cb, cbf_cr, and BlockCoeff_cr are coded in order.

Figure 20:
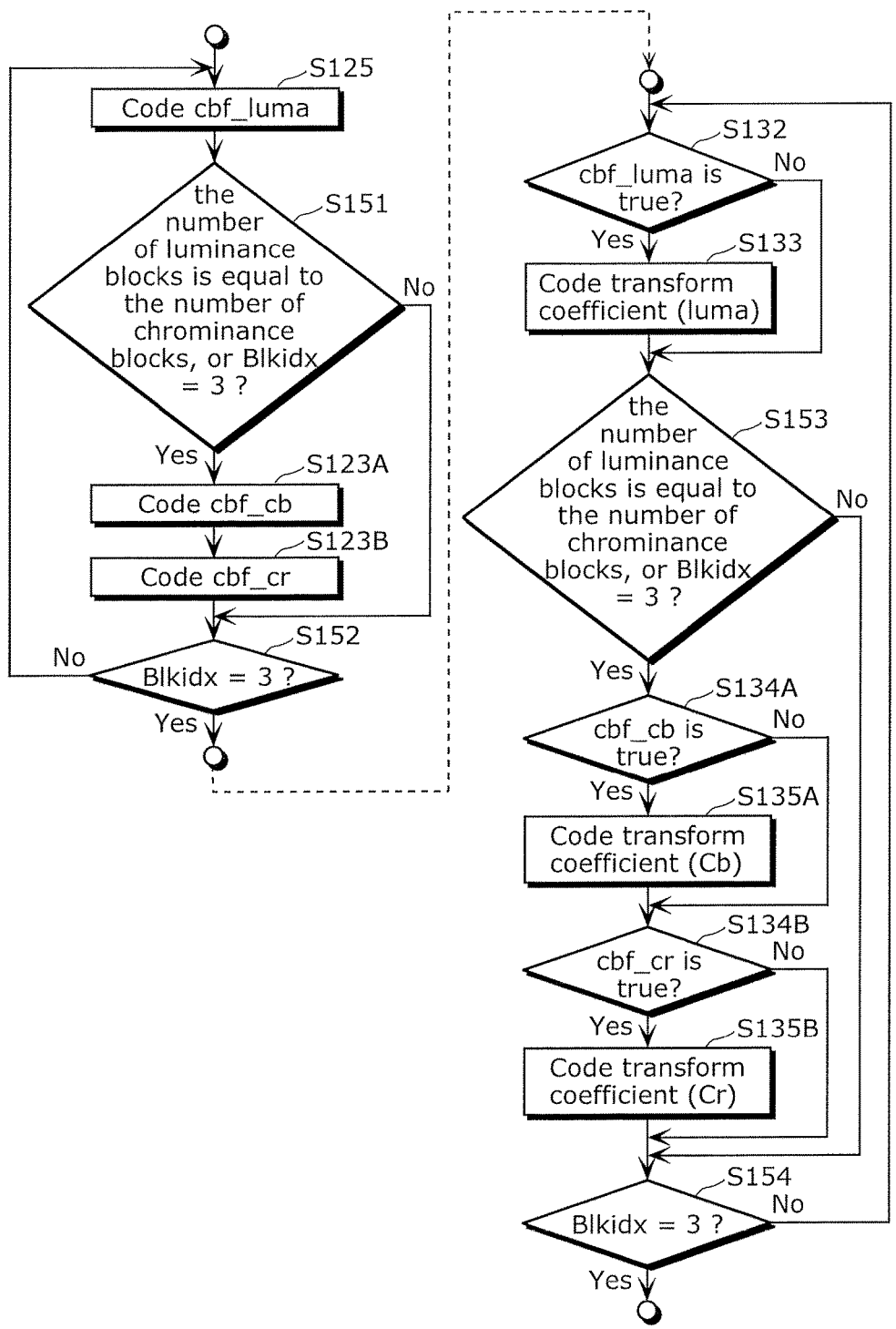
FIG. 20 is a flowchart of coding according to Embodiment 5.

FIG. 20 is a flowchart of coding according to the present embodiment. FIG. 20 shows only the processing for CBFs and transform coefficients which is a part of the coding. Here, four split blocks are associated with respective BlkIdx in a Z order.

The series of Steps S125 to S152 in FIG. 20 are processing for coding CBF. The series of Steps S125 to S123B are performed on each of the four split blocks.

For a certain block, the image coding apparatus 100 codes cbf_luma (S125). Next, the image coding apparatus 100 determines whether or not the number of blocks of luminance signal is equal to the number of blocks of chrominance signal. In addition, the image coding apparatus 100 determines whether or not Blkidx=3 (S151). In other words, it is determined whether or not a current TU is a last TU of the four split TUs in the coding order. If the number of blocks of luminance signal is equal to the number of blocks of chrominance signal, or if Blkidx=3 (Yes at S151), then the image coding apparatus 100 codes cbf_cb and cbf_cr (S123A and S123B). For example, if TrafoSize that is a size of luminance signal block at a current TrD does not reach the minimum size MinTrafoSize (TrafoSize>MinTrafoSize), then it is determined that the number of blocks of luminance signal is equal to the number of blocks of chrominance signal. It is also possible that the image coding apparatus 100 uses a different method to determine whether or not the number of blocks of luminance signal is equal to the number of blocks of chrominance signal.

Even if blocks of luminance signal is less than blocks of chrominance signal, the image coding apparatus 100 codes cbf_chroma after coding all of cbf_luma. In other words, in the case of splitting to four blocks, coding of cbf_luma of the four blocks have been completed when Blkidx=3. Therefore, the image coding apparatus 100 determines that cbf_chroma is to be performed when Blkidx=3.

In summary, the image coding apparatus 100 codes cbf_chroma after coding cbf_luma when (Trafosize>MinTrafoSize)||(Blkidx==3).

On the other hand, if Blkidx is not 3 (No at S152), then a next block is selected to perform the processing from Step S125.

The series of Steps S132 to S154 in FIG. 20 are processing for coding a transform coefficient. The series of Steps S132 to S135B are performed on each of four split blocks in the same manner as the CBF coding.

The image coding apparatus 100 determines whether or not cbf_luma is true (S132). If cbf_luma is true (Yes at S132), then the image coding apparatus 100 codes a transform coefficient of luminance signal of a current TU (S133). Next, the image coding apparatus 100 performs the same determination as Step S151 (S153).

If the determination is made as true (Yes at S153), then the image coding apparatus 100 determines whether cbf_cb is true (S134A). If cbf_cb is true (Yes at S134A), then the image coding apparatus 100 codes a transform coefficient of chrominance Cb (S135A). The image coding apparatus 100 determines whether or not cbf_cr is true (S134B). If cbf_cr is true (Yes at S134B), then the image coding apparatus 100 codes a transform coefficient of chrominance Cr (S135B).

Note that, in the flow described with reference to FIG. 20, if "coding" is replaced by "decoding", a flow of decoding performed by the image decoding apparatus 200 can be obtained. Furthermore, in the coding orders described with reference to FIG. 18A to 18C, FIGS. 19A and 19B, if "coding" is replaced by "decoding", a decoding order of decoding coded pieces of data can be obtained.

Each of FIGS. 21A and 21B shows an example where CBFs and transform coefficients of chrominance signal are coded prior to CBFs and transform coefficients of luminance signal. As described above, in inter prediction, cbf_chroma is sometimes coded before cbf_luma. Therefore, if blocks of chrominance signal are coded earlier, it is possible to cause an order of processing cbf_chroma and cbf_luma to be the same between inter prediction and intra prediction. As a result, it is possible to simplify the flows of the processing performed by the image coding apparatus 100 and the image decoding apparatus 200.

Embodiment 6

Embodiment 6 is a variation of the above-described Embodiment 3. In the image coding method according to the present embodiment, a difference quantization parameter (ΔQP) is coded. ΔQP is information indicating a difference between a quantization step used in immediately-prior quantization and a quantization step used in quantization of a current transform unit.

Figure 22A:
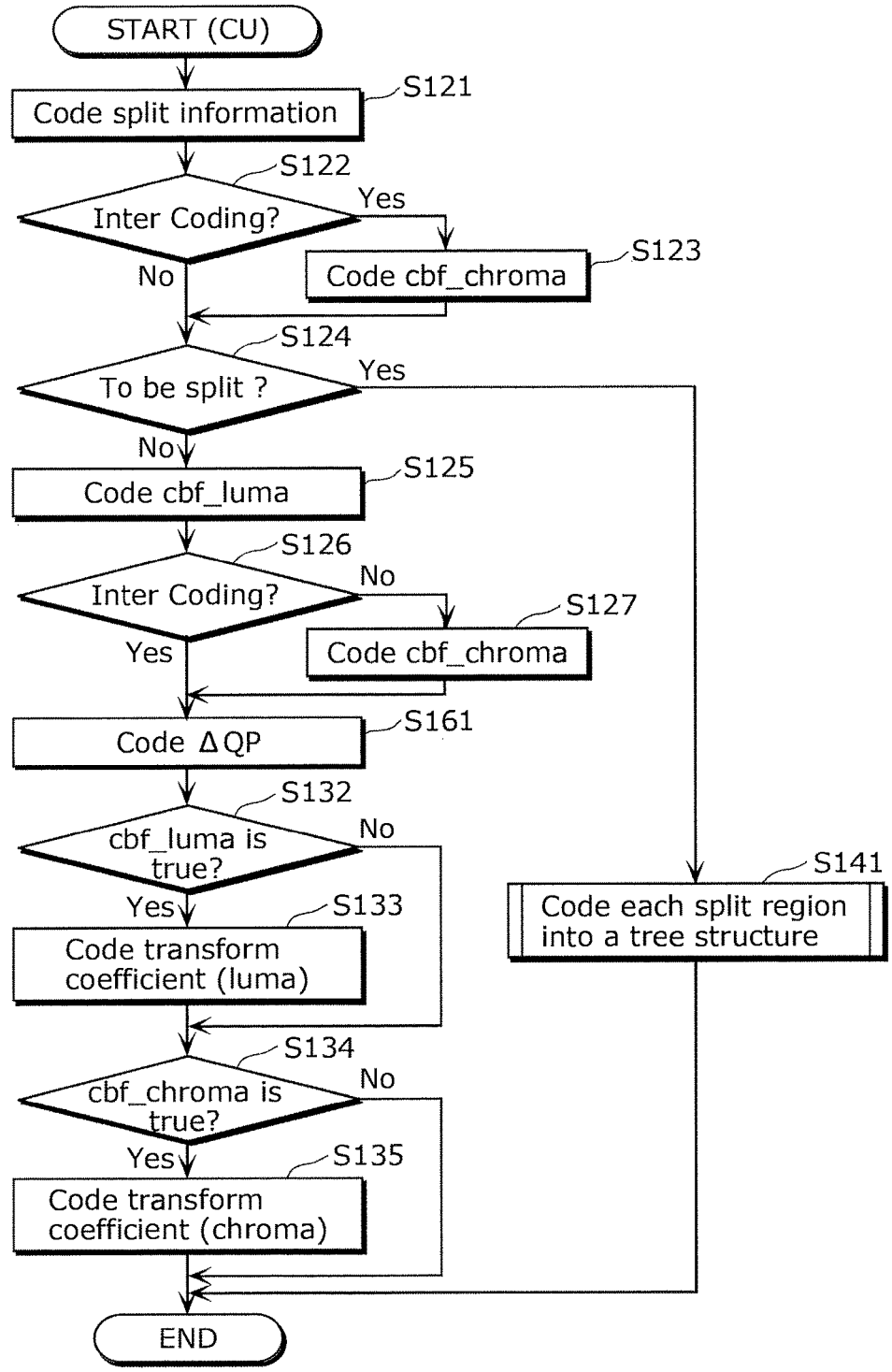
FIG. 22A is a flowchart of coding according to Embodiment 6.
Figure 22B:
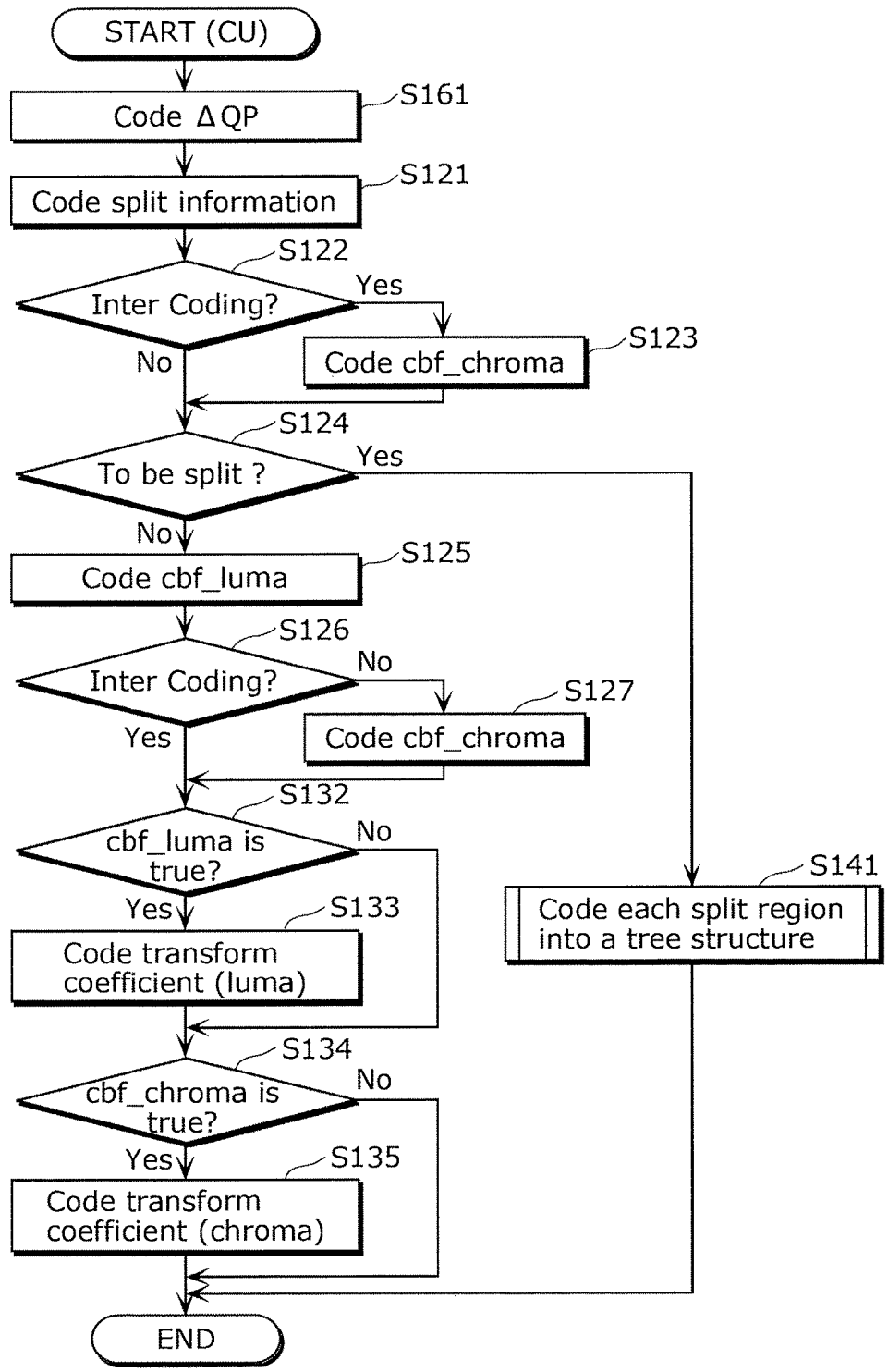
FIG. 22B is a flowchart of coding according to Embodiment 6.

Each of FIGS. 22A and 22B is a flowchart of coding according to the present embodiment. The following describes mainly differences from FIG. 15.

ΔQP is coded after coding all CBFs. More specifically, the image coding apparatus 100 codes ΔQP after coding cbf_chroma (S123 or S127) and coding cbf_luma (S125), and before coding a transform coefficient (S133 and S135) (S161).

As described above, the image coding apparatus 100 codes ΔQP at a current leaf node in a tree structure, and arranges the coded ΔQP at a position corresponding to the current leaf node of the coded signal 191. Furthermore, at the leaf node, the image decoding apparatus 200 decodes the coded ΔQP which is arranged at the position corresponding to the leaf node in the tree structure of the coded signal 191.

Here, the image decoding apparatus 200 may decode a transform coefficient, and immediately at the same perform inverse quantization immediately, by using pipeline parallel processing. In this case, the coding of ΔQP in the above-described coding order to determine a quantization parameter does not occur unnecessary delay or memory increase.

In a certain coding unit CU, ΔQP is coded only once in a TU where cbf_luma and cbf_chroma are first true. If ΔQP is updated more often, a coding amount is increased too much.

FIG. 22B is a flowchart of a coding method in the case where ΔQP is coded at a root of the tree structure of TUs. As shown in FIG. 22B, the image coding apparatus 100 codes the root of the tree structure of TUs (S161).

As described above, the image coding apparatus 100 codes ΔQP at a root of the tree structure, and arranges the coded difference quantization step at a position corresponding to the root of the coded signal 191. In addition, the image decoding apparatus 200 decodes, at the root, the coded difference quantization step that is arranged at the position at the root of the tree structure of the coded signal 191.

In this case, the image decoding apparatus 200 can determine, at an earlier stage, a quantization parameter required by the inverse quantization unit 240. Therefore, the image decoding apparatus 200 can perform activation of the inverse quantization unit 240 early. The image coding apparatus 100 does not code ΔQP always. ΔQP is coded only when no_residual_data is true for each coding unit CU. As a result, a data amount can be reduced. no_residual_data is a flag indicating that there is no transform coefficient in a current CU. This no_residual_data is coded prior to the first TUS in a current CU.

Note that, in the flow described with reference to FIGS. 22A and 22B, if "coding" is replaced by "decoding", a flow of decoding performed by the image decoding apparatus 200 can be obtained.

Each of FIGS. 23 and 24A to 24C shows an example of syntax of HEVC corresponding to Embodiment 6.

Embodiment 7

Embodiment 7 is a variation the above-described Embodiment 3.

Figure 25A:
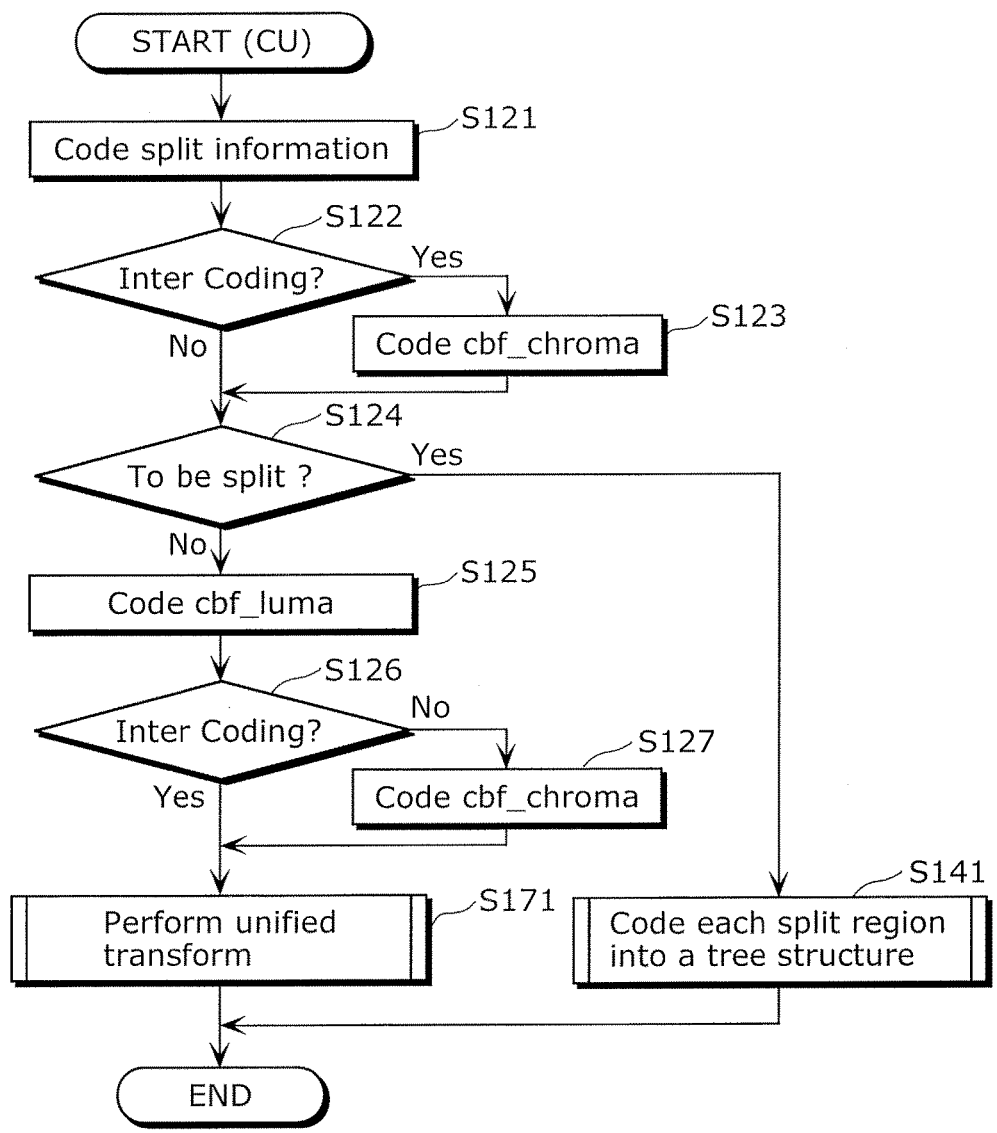
FIG. 25A is a flowchart of coding according to Embodiment 7.
Figure 25B:
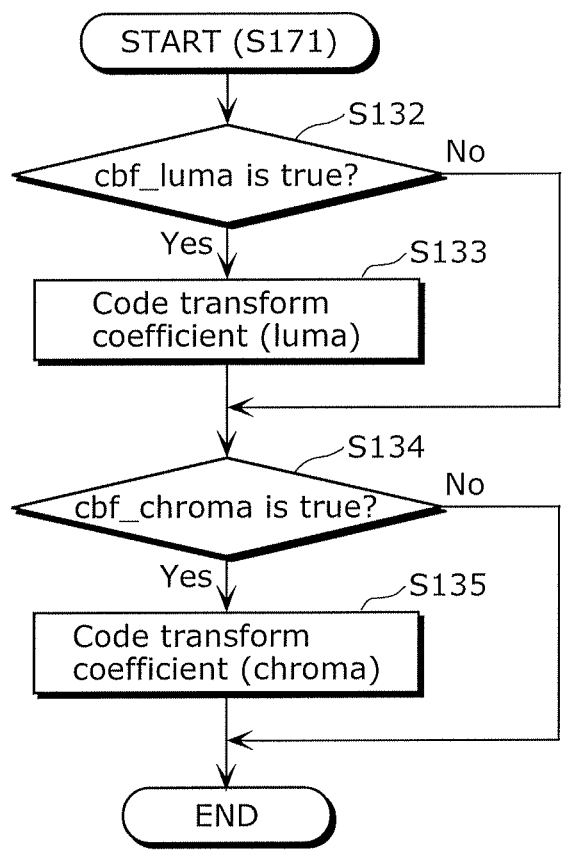
FIG. 25B is a flowchart of unified transform according to Embodiment 7.

Each of FIGS. 25A and 25B is a flowchart of coding performed by the image coding apparatus 100 according to the present embodiment.

In the coding in FIGS. 25A and 25B, the coding of a transform coefficient shown in FIG. 15 (S132 to S135) is extracted as unified transform (transform_unified_unit) (S171) that is one of subroutines. In the same manner as described in the previous embodiments, the present embodiment also produces effects of reducing an amount of a memory for temporarily storing information of CBFs and TUSs, simplifying steps in the processing, and decreasing the number of traverses. It is also possible that the series of Steps S125 to S127 are included in the unified transform. In this case, the subroutine corresponds to the processing for a leaf node in the tree structure of TUs. Furthermore, ΔQP may be coded in the unified transform. In addition to the substantially same effects, the provision of the subroutine can produce further effects of power saving in design by separating the steps and test reduction.

Although only some exemplary embodiments of the image coding apparatus and the image decoding apparatus according to the present invention have been described in detail above, the present invention is not limited to these embodiments.

Note also that processing units in each of the image coding apparatus and the image decoding apparatus according to the above embodiments are typically implemented into a Large Scale Integration (LSI) which is an integrated circuit. These may be integrated separately, or a part or all of them may be integrated into a single chip.

Note also that the technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Note also that each of the structural elements in the above embodiments may be implemented by a dedicated hardware, or implemented by executing a software program suitable for the structural element. Each of the structural elements may be implemented when a program execution unit such as a CPU or a processor reads a software program recorded on a recording medium such as a hard disk or a semiconductor memory and executes the readout software program.

Furthermore, the prevent invention may be software program, or may be a non-transitory computer-readable recording medium on which the program is recorded. Of course, the above-described program may be distributed via a transmission medium such as the Internet.

Furthermore, the numerals in the above description are examples for explaining the present disclosure in more detail. The present disclosure is not limited to the example numerals.

Moreover, the splitting of the functional blocks in the block diagrams are examples. It is also possible that a plurality of functional blocks are implemented as one functional block, that one functional block is split into a plurality of pieces, or that shifts a partial function to other functional blocks. In addition, the functions of the plurality of functional blocks having similar functions may be performed in parallel or in time sharing by a common single hardware or software.

The order of executing the steps included in each of the above-described image coding method and the above-described image decoding method is the example of explaining the present disclosure in more detail. Therefore, different orders except the above-described order may be used. A part of the steps may be executed at the same time (in parallel) with other steps.

Thus, although only some exemplary embodiments of the image coding apparatus and the image decoding apparatus according to the present invention have been described in detail above, the present invention is not limited to these embodiments. Those skilled in the art will be readily appreciated that various modifications of the exemplary embodiments and combinations of the structural elements of the different embodiments are possible without materially departing from the novel teachings and advantages of the present disclosure. Accordingly, all such modifications and combinations are intended to be included within the scope of the present disclosure.

Embodiment 8

The processing described in each of Embodiments can be simply implemented in an independent computer system, by recording, in a recording medium, a program for implementing the configurations of the moving picture coding method (image coding method) and the moving picture decoding method (image decoding method) described in each of Embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of Embodiments and systems using thereof will be described. The system has a feature of having an image coding and decoding apparatus that includes an image encoding apparatus using the image encoding method and an image decoding apparatus using the image decoding method. Other configurations in the system can be changed as appropriate depending on the cases.

Figure 26:
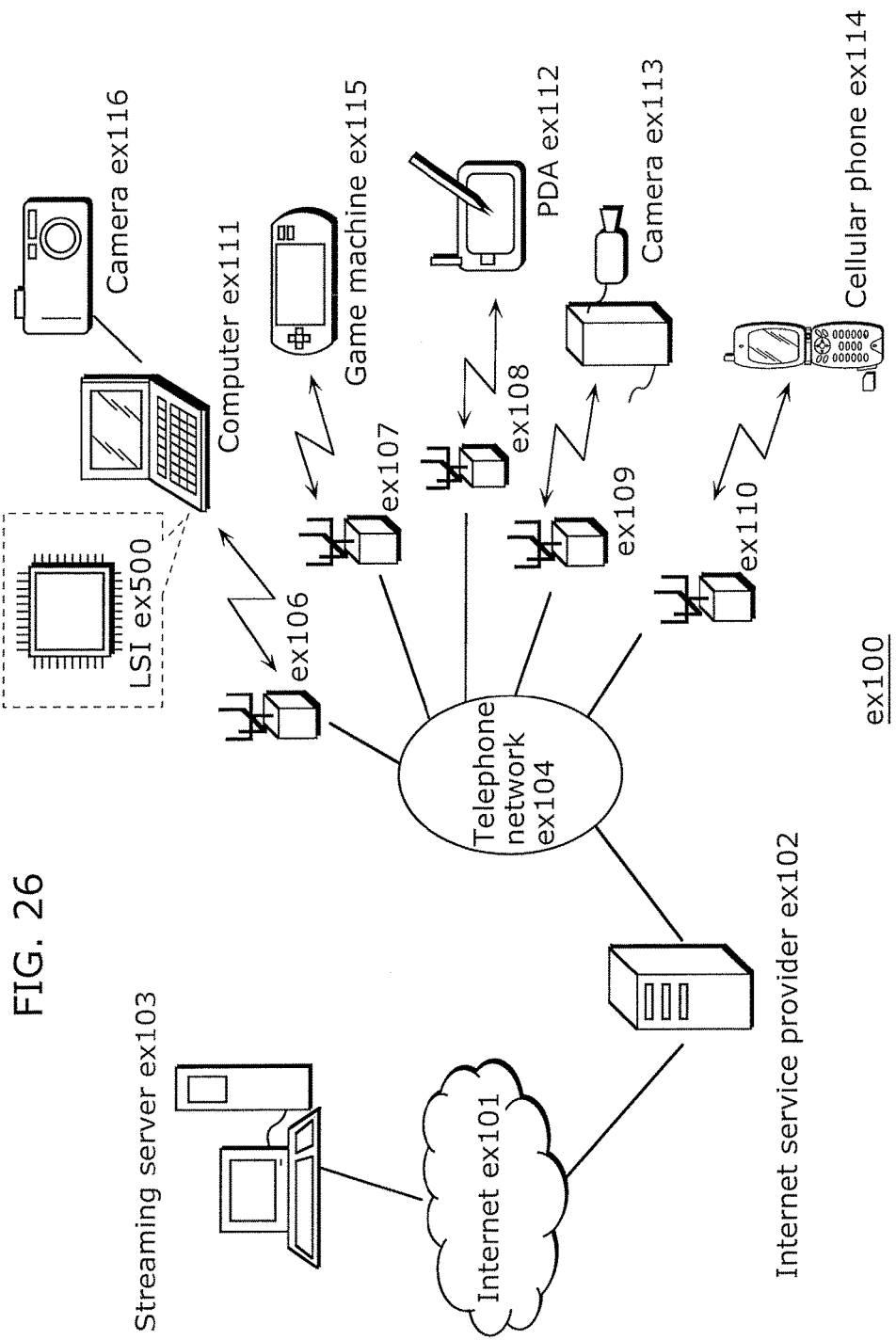
FIG. 26 shows an overall configuration of a content providing system for implementing content distribution services.

FIG. 26 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 26, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments (i.e., the camera functions as the image coding apparatus of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., the devices each function as the image decoding apparatus of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 27:
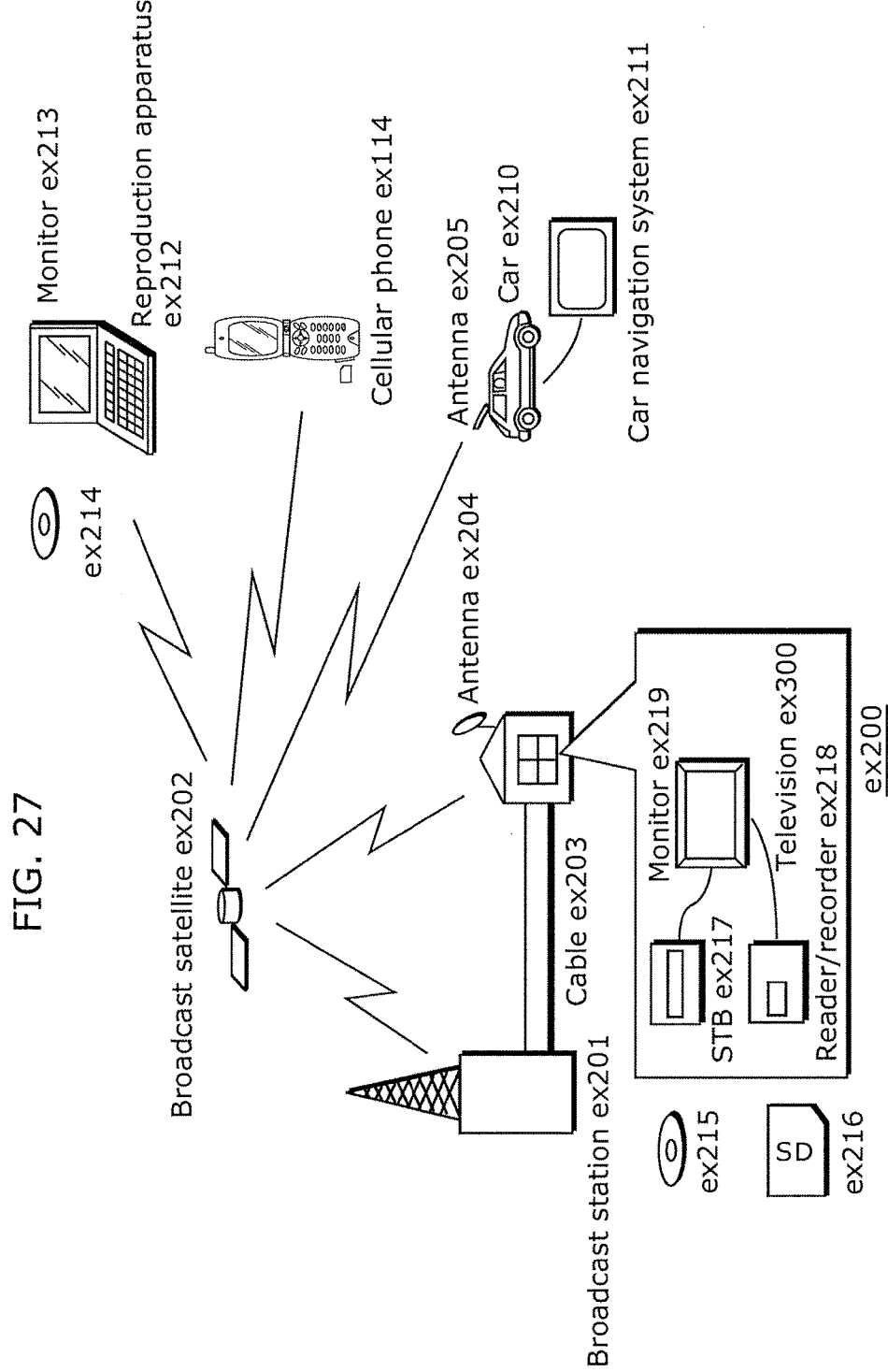
FIG. 27 shows an overall configuration of a digital broadcasting system.

Aside from the example of the content providing system ex100, at least one of the moving picture coding apparatus (image coding apparatus) and the moving picture decoding apparatus (image decoding apparatus) described in each of Embodiments may be implemented in a digital broadcasting system ex200 illustrated in FIG. 27. More specifically, a broadcast station ex201 communicates or transmits, via radio waves to a broadcast satellite ex202, multiplexed data obtained by multiplexing audio data and others onto video data. The video data is data coded by the moving picture coding method described in each of Embodiments (i.e., data coded by the image coding apparatus of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., the device functions as the image coding apparatus of the present disclosure).

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of Embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 28:
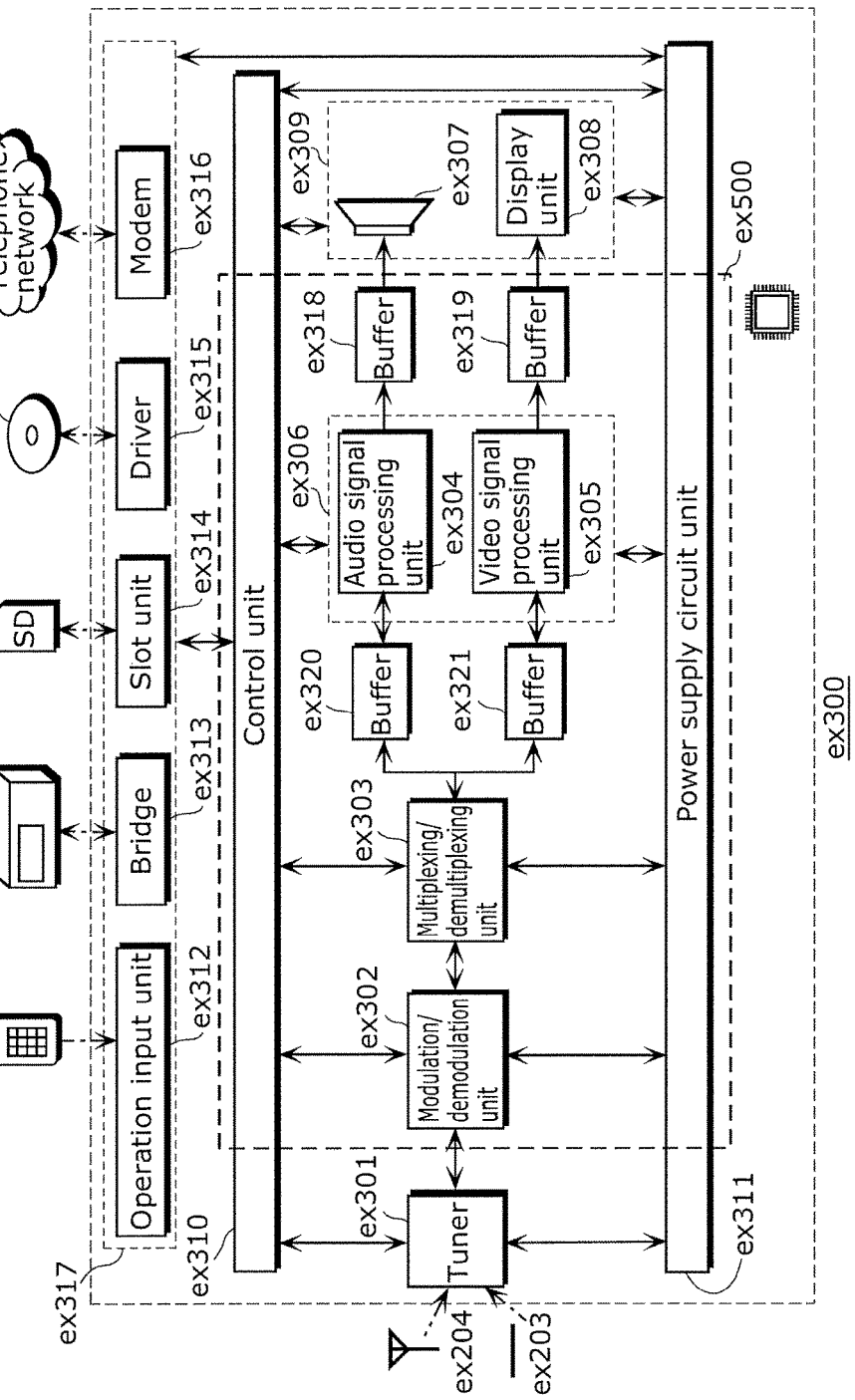
FIG. 28 shows a block diagram illustrating an example of a configuration of a television.

FIG. 28 illustrates the television (receiver) ex300 that uses the moving picture coding method and the moving picture decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, (which function as the image coding apparatus and the image decoding apparatus), respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 29:
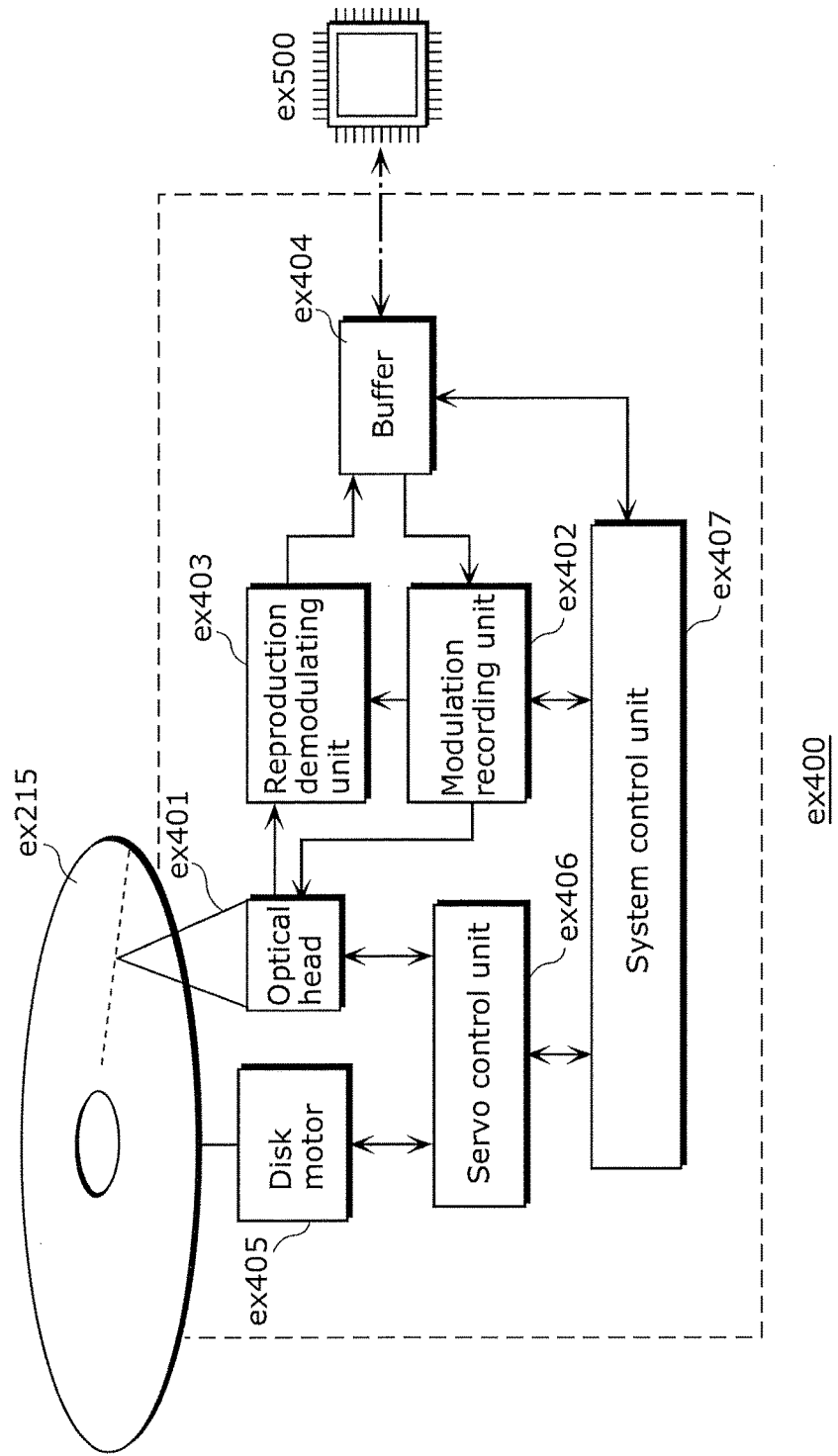
FIG. 29 shows a block diagram illustrating an example of a configuration of an information reproducing/recording unit that reads and writes information from and on a recording medium that is an optical disk.

As an example, FIG. 29 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 30:
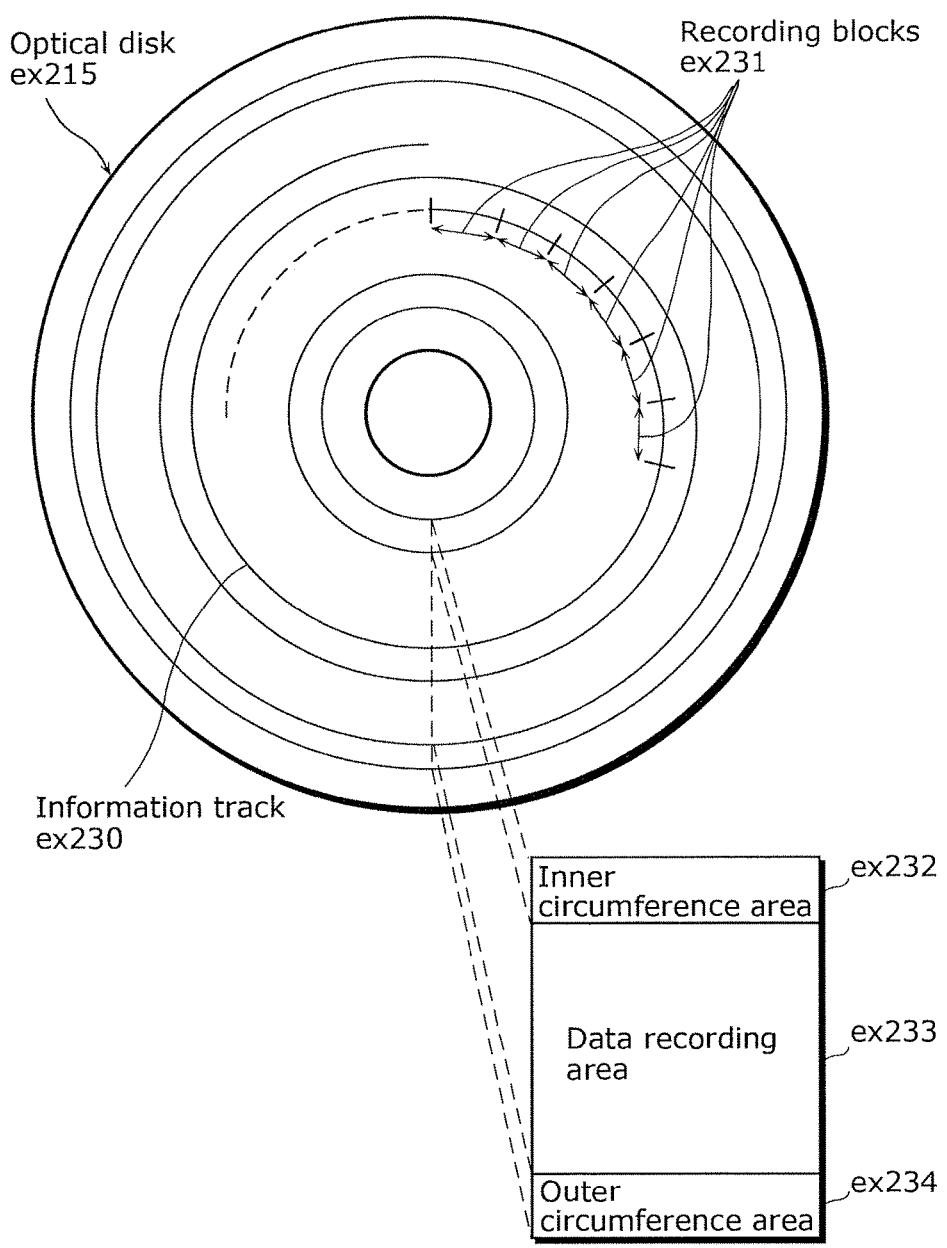
FIG. 30 shows an example of a configuration of a recording medium that is an optical disk.

FIG. 30 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having, a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 28. The same will be true for the configuration of the computer ex111, the cellular phone ex114, and others.

Figure 31A:
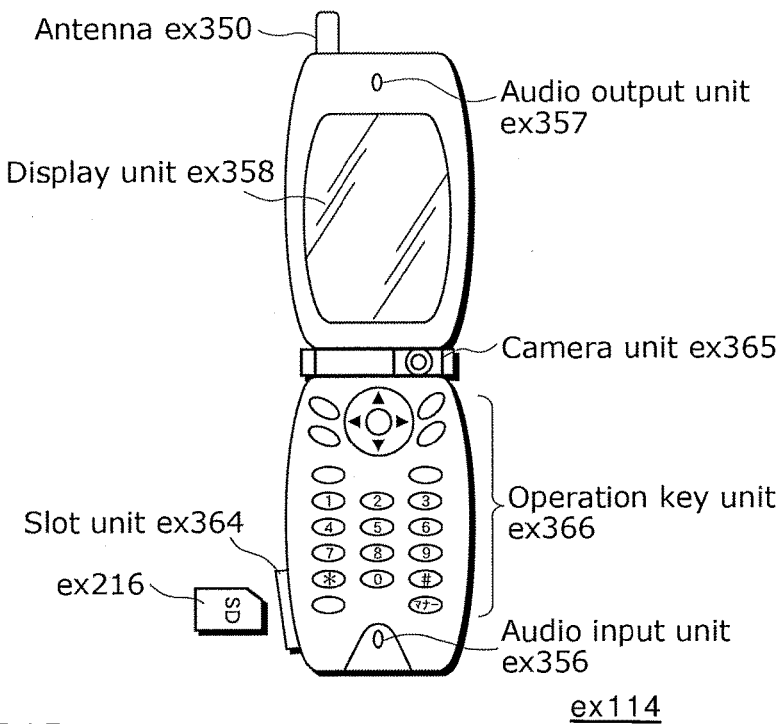
FIG. 31A shows an example of a cellular phone.

FIG. 31A illustrates the cellular phone ex114 that uses the moving picture coding method and the moving picture decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others;

and a slot unit ex364 that is an interface unit for a recording medium that stores data in the same manner as the memory unit ex367.

Figure 31B:
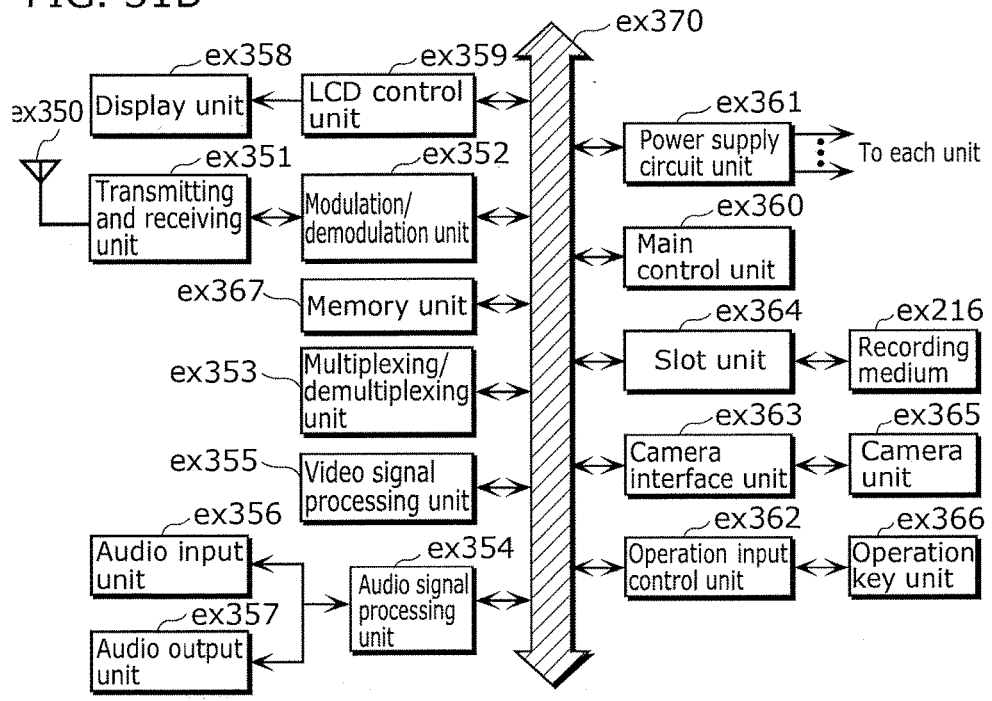
FIG. 31B is a block diagram showing an example of a configuration of a cellular phone.

Next, an example of a configuration of the cellular phone ex114 will be described with reference to FIG. 31B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of Embodiments (i.e., functions as the image coding apparatus of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of Embodiments (i.e., functions as the image decoding apparatus of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of Embodiments can be used in any of the devices and systems described. Thus, the advantages described in each of Embodiments can be obtained.

Furthermore, the present disclosure is not limited to Embodiments, and various modifications and revisions are possible without departing from the scope of the present disclosure.

Embodiment 9

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of Embodiments will be hereinafter described. The multiplexed data is a digital stream in the MPEG2-Transport Stream format.

FIG. 32 illustrates a structure of the multiplexed data. As illustrated in FIG. 32, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 33:
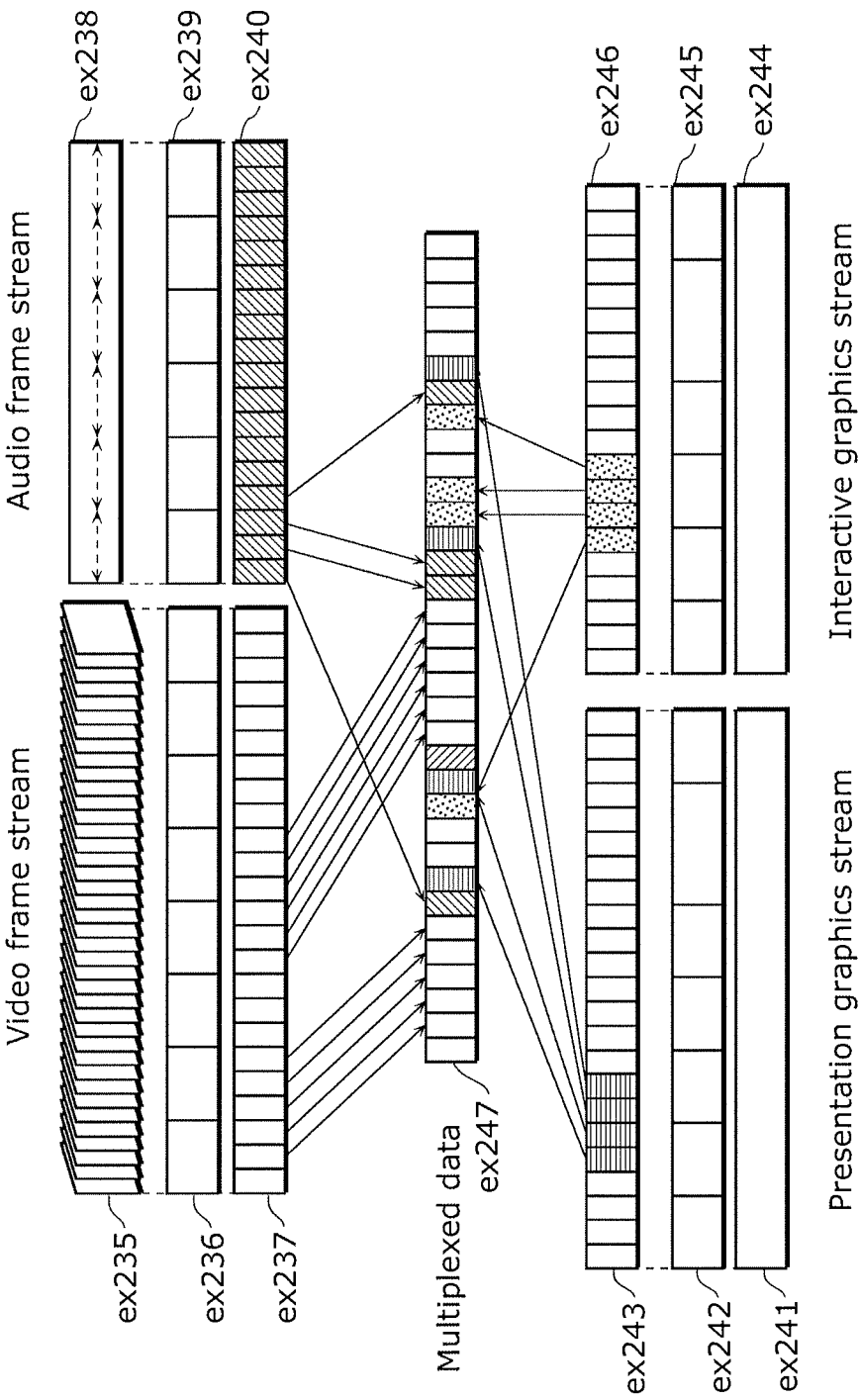
FIG. 33 schematically shows how each stream is multiplexed in multiplexed data.

FIG. 33 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 34:
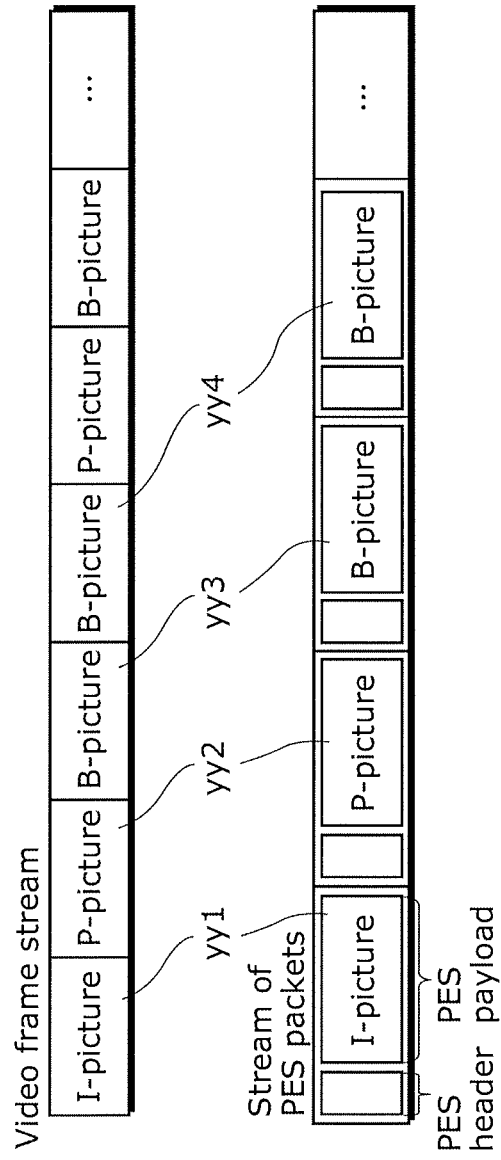
FIG. 34 shows how a video stream is stored in a stream of PES packets in more detail.

FIG. 34 illustrates how a video stream is stored in a stream of PES packets in more detail. The first bar in FIG. 34 shows a video frame stream in a video stream. The second bar shows the stream of PES packets. As indicated by arrows denoted as yy1, yy2, yy3, and yy4 in FIG. 34, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 35 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 35. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 36:
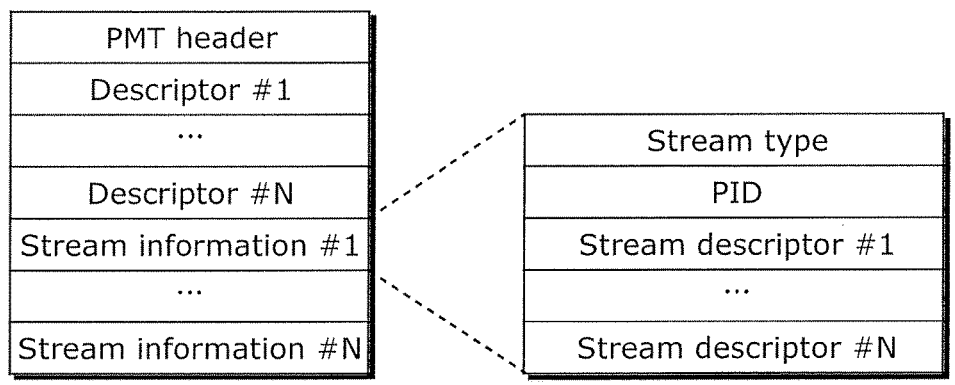
FIG. 36 shows a data structure of a PMT.

FIG. 36 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 37:
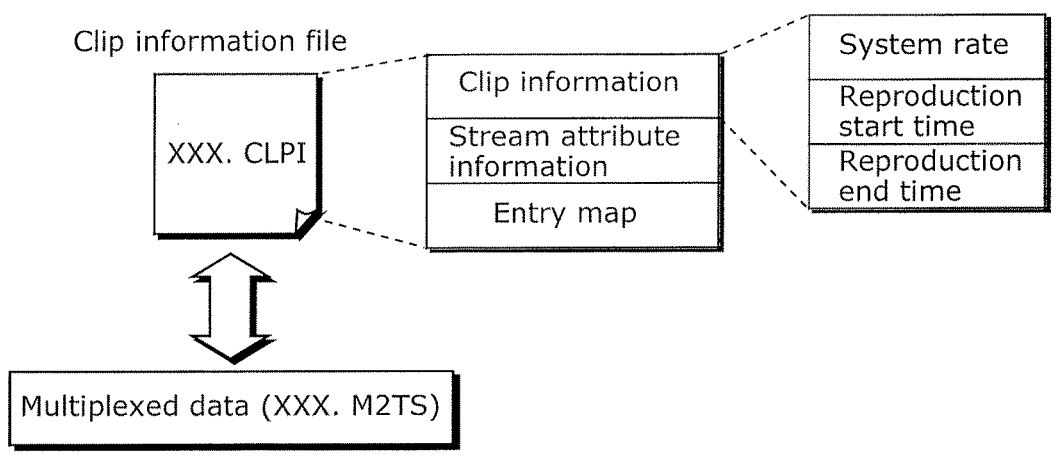
FIG. 37 shows an internal structure of multiplexed data information.

Each of the multiplexed data information files is management information of the multiplexed data as shown in FIG. 37. The multiplexed data information files are in one to one correspondence with the multiplexed data, and each of the files includes multiplexed data information, stream attribute information, and an entry map.

As illustrated in FIG. 37, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 38:
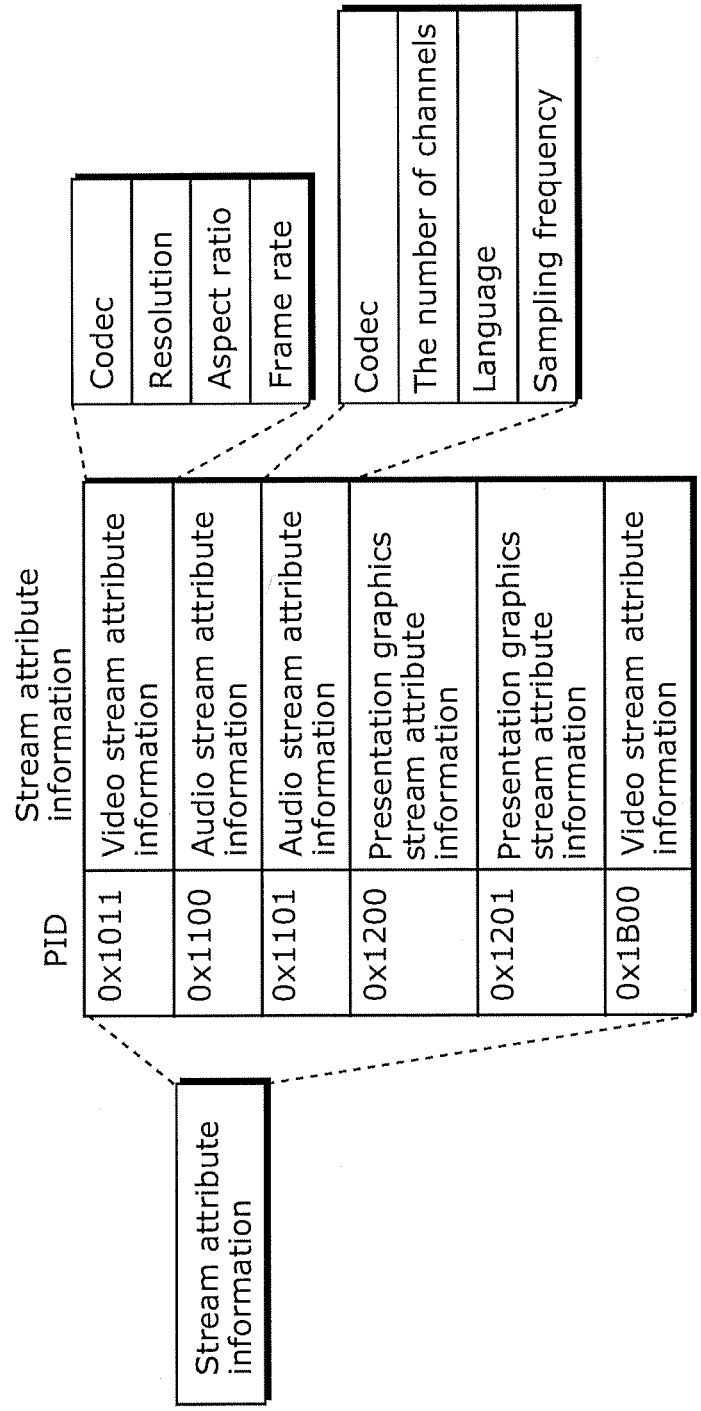
FIG. 38 shows an internal structure of stream attribute information.

As shown in FIG. 38, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the configuration, the video data generated by the moving picture coding method or the moving picture coding apparatus described in each of Embodiments can be distinguished from video data that conforms to another standard.

Figure 39:
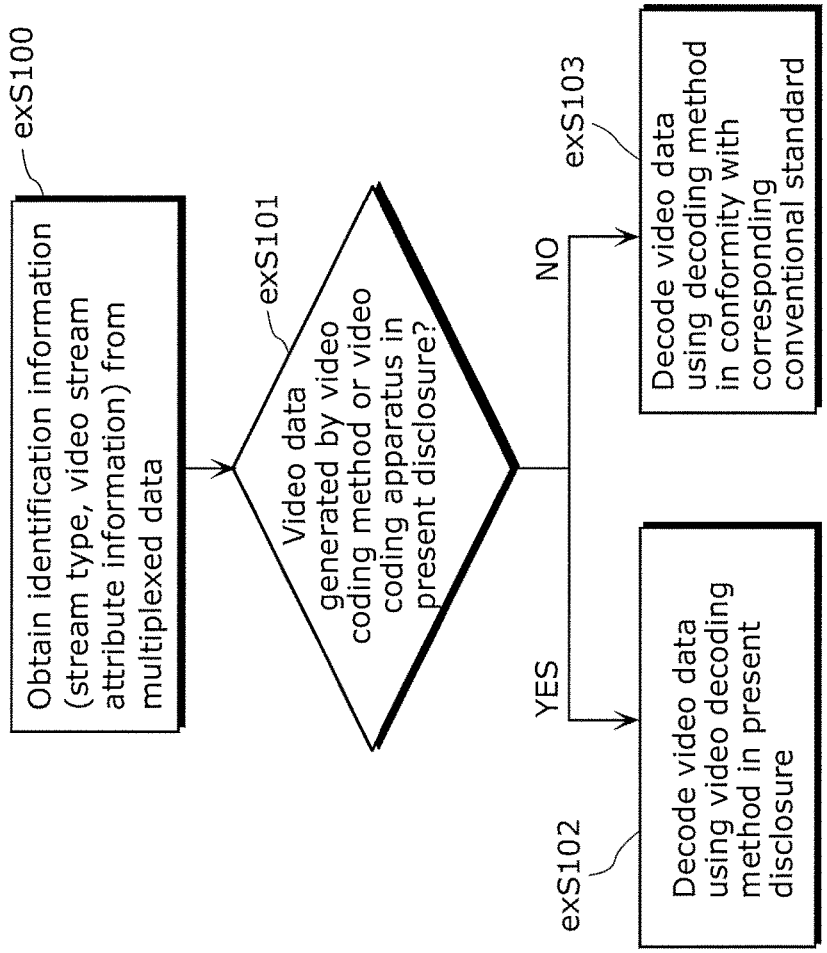
FIG. 39 shows steps for identifying video data.

Furthermore, FIG. 39 illustrates steps of the moving picture decoding method according to the present embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, decoding is performed by the moving picture decoding method in each of Embodiments. Furthermore, when the stream type or the video stream attribute information indicates conformance to the conventional standards, such as MPEG-2, MPEG4-AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even when multiplexed data that conforms to a different standard, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 10

Figure 40:
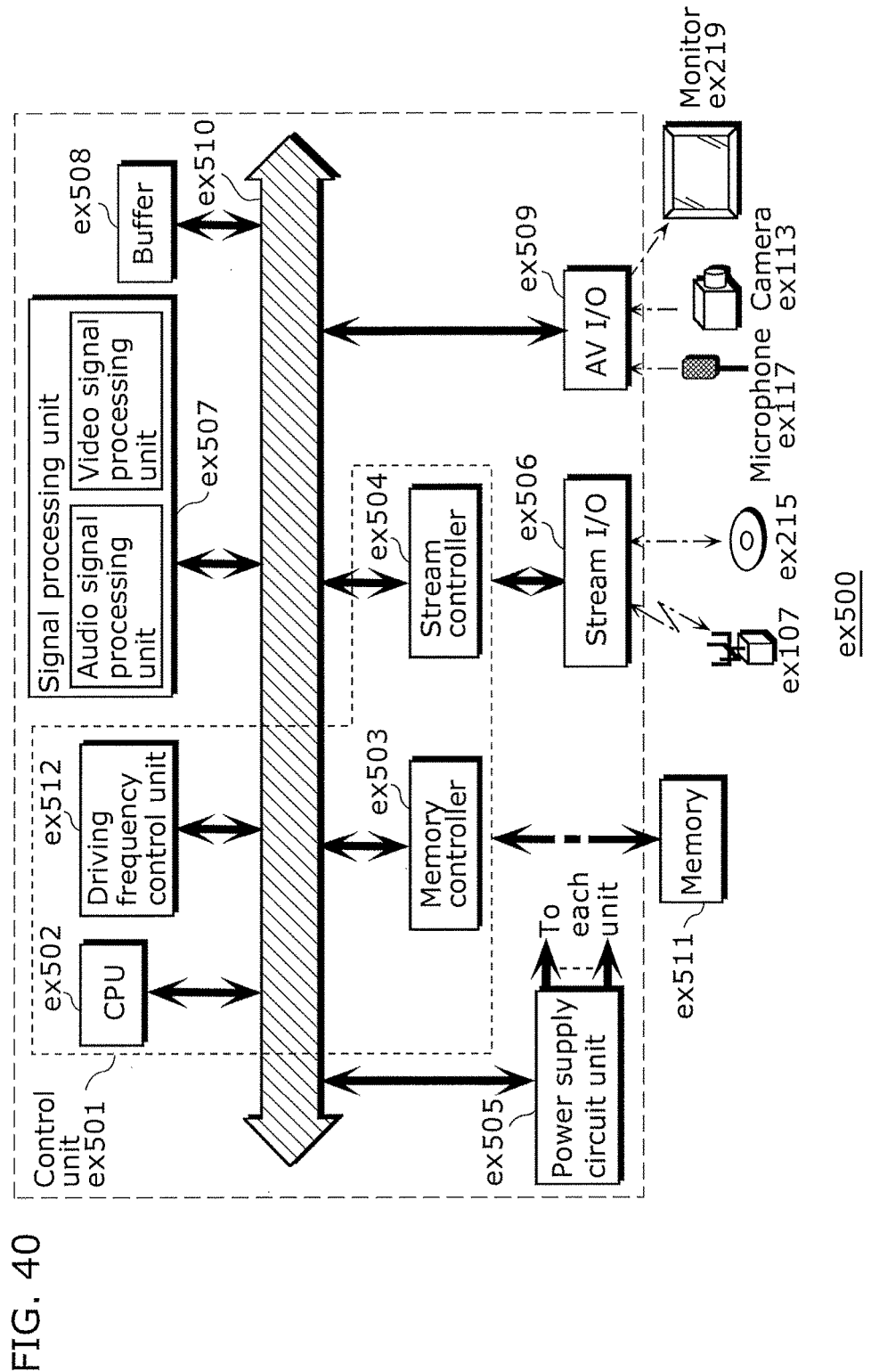
FIG. 40 shows an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example of the LSI, FIG. 40 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 11

When video data generated in the moving picture coding method or by the moving picture coding apparatus described in each of Embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 41:
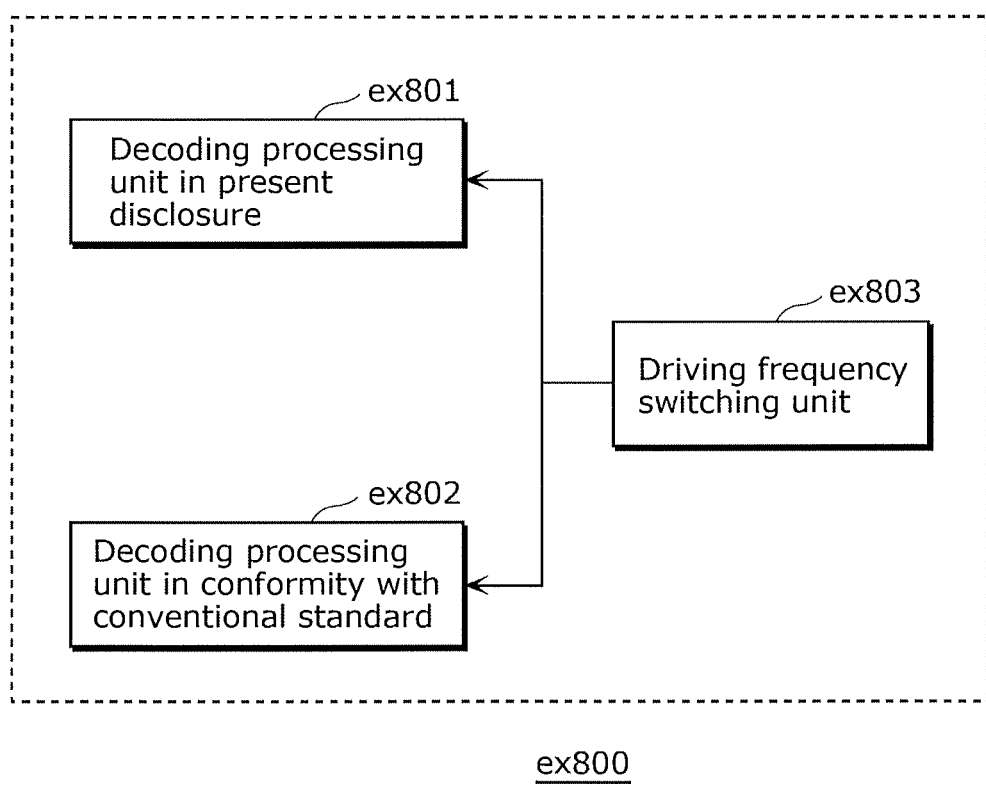
FIG. 41 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 41 illustrates a configuration ex800 in the present embodiment. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 40. Here, each of the decoding processing unit ex801 that executes the moving picture decoding method described in each of Embodiments and the decoding, processing unit ex802 that conforms to the conventional standard corresponds to the signal processing unit ex507 in FIG. 40. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 9 is probably used for identifying the video data. The identification information is not limited to the one described in Embodiment 9 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 43. The driving frequency can be selected by storing the look-up table in the buffer ex508 and in an internal memory of an LSI, and with reference to the look-up table by the CPU ex502.

Figure 42:
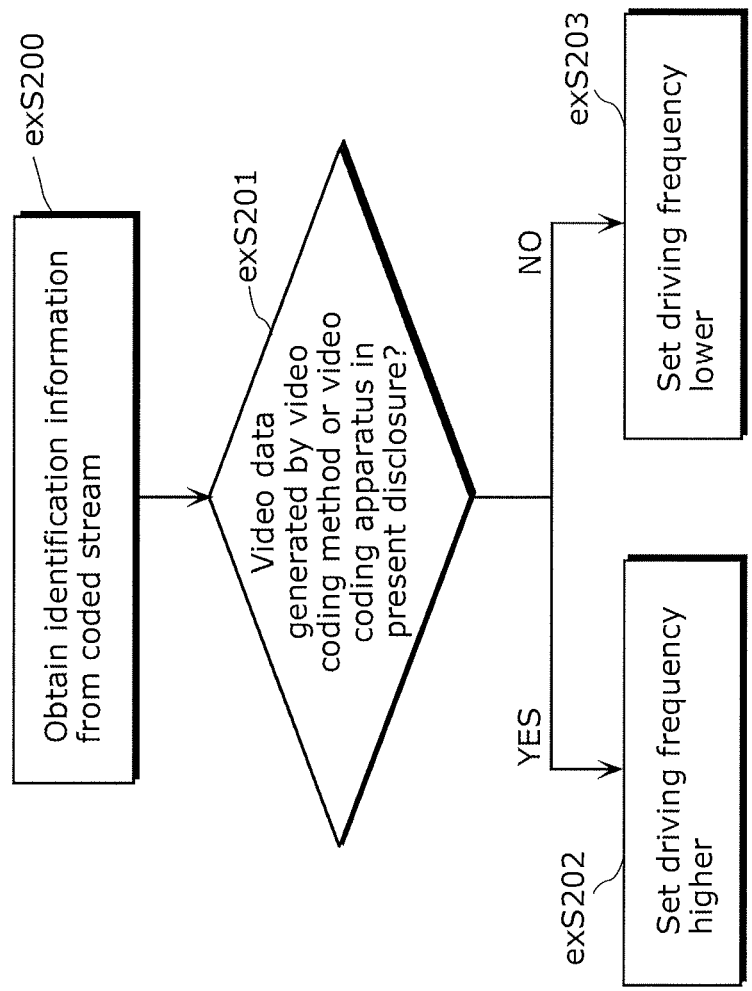
FIG. 42 shows steps for identifying video data and switching between driving frequencies.

FIG. 42 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the moving picture coding method and the moving picture coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG 4-AVC is larger than the processing amount for decoding video data generated by the moving picture coding method and the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 12

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 44A:
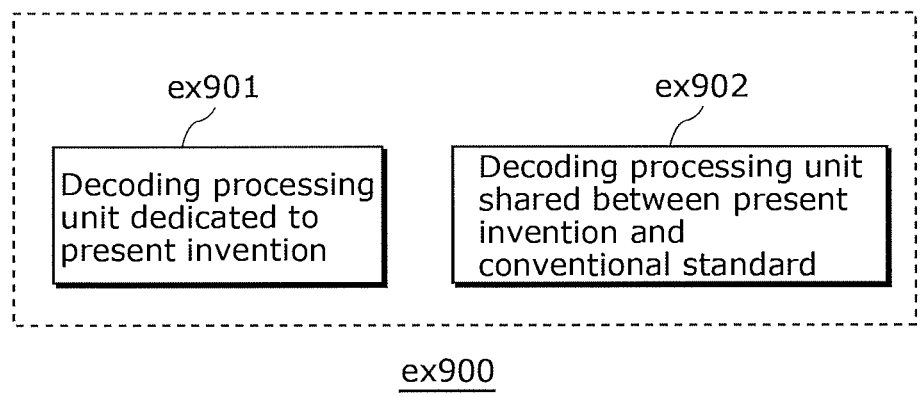
FIG. 44A is a diagram showing an example of a configuration for sharing a module of a signal processing unit.

In order to solve the problem, what is conceived is a configuration in which the decoding processing unit for implementing the moving picture decoding method described in each of Embodiments and the decoding processing unit that conforms to the conventional standard, such as MPEG-2, MPEG4-AVC, and VC-1 are partly shared. Ex900 in FIG. 44A shows an example of the configuration. For example, the moving picture decoding method described in each of Embodiments and the moving picture decoding method that conforms to MPEG4-AVC have, partly in common, the details of processing, such as entropy coding, inverse quantization, deblocking filtering, and motion compensated prediction. The details of processing to be shared probably include use of a decoding processing unit ex902 that conforms to MPEG4-AVC. In contrast, a dedicated decoding processing unit ex901 is probably used for other processing unique to the present disclosure. Since the present disclosure is characterized by entropy decoding processing in particular, for example, the dedicated decoding processing unit ex901 is used for entropy decoding processing. Otherwise, the decoding processing unit is probably shared for one of inverse quantization, deblocking filtering, and motion compensation, or all of the processing. The decoding processing unit for implementing the moving picture decoding method described in each of Embodiments may be shared for the processing to be shared, and a dedicated decoding processing unit may be used for processing unique to that of MPEG4-AVC.

Figure 44B:
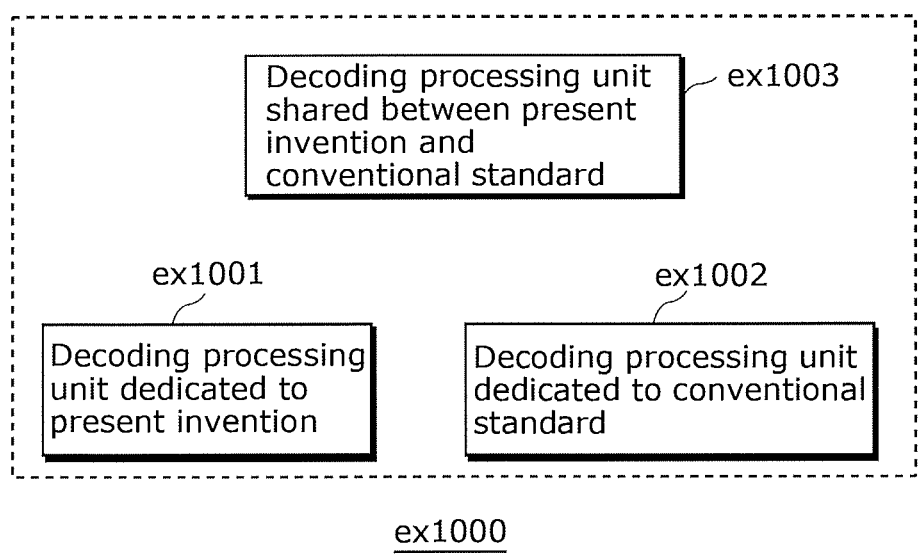
FIG. 44B is a diagram showing another example of a configuration for sharing a module of the signal processing unit.

Furthermore, ex1000 in FIG. 44B shows another example in that processing is partly shared. This example uses a configuration including a dedicated decoding processing unit ex1001 that supports the processing unique to the present disclosure, a dedicated decoding processing unit ex1002 that supports the processing unique to another conventional standard, and a decoding processing unit ex1003 that supports processing to be shared between the moving picture decoding method in the present disclosure and the conventional moving picture decoding method. Here, the dedicated decoding processing units ex1001 and ex1002 are not necessarily specialized for the processing of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method in the present disclosure and the moving picture decoding method in conformity with the conventional standard.

INDUSTRIAL APPLICABILITY

The present disclosure can be applied to image coding methods, image decoding methods, image coding apparatuses, and image decoding apparatuses. The present disclosure is also applicable to high-resolution information display apparatuses or imaging apparatuses such as television sets, digital video recorders, in-vehicle navigation systems, portable phones, digital cameras, and digital camcorders, each of which includes an image coding apparatus.

The invention claimed is:

1. An image decoding method, comprising:
   determining a coding standard to which coded video data conforms;
   setting a driving frequency of a decoder for decoding the coded video data according to the determined coding standard;
   decoding, using the decoder, the coded video data to generate quantization coefficients and pieces of management information, the quantization coefficients each corresponding to a corresponding one of transform units, and the pieces of the management information indicating a structure of the transform units,
   wherein pieces of the management information have a tree structure,
   wherein each of the transform units corresponds to a corresponding one of leaf nodes in the tree structure,
   wherein the decoding includes decoding, for each of the leaf nodes, a set including (i) a coded piece of the management information and (ii) a coded quantization coefficient arranged next to the coded piece of the management information, the sets being arranged in succession in the coded video data,
   wherein the leaf nodes include a first leaf node and a second leaf node,
   wherein the set corresponding to the first leaf node including the coded piece of the management information and the coded the quantization coefficient for the first leaf node is arranged in the coded video data before the set corresponding to the second leaf node including the coded piece of the management information and the coded quantization coefficient for the second leaf node, such that in the decoding, the set corresponding to the first leaf node is decoded before the set corresponding to the second leaf node is decoded,
   wherein the management information includes one or more split flags, each of which indicates whether or not a current node is further split into nodes at a level lower than a current level for a transformation, and wherein the management information includes (i) one or more first flags that indicate whether or not luminance quantization coefficients exist in the transform unit corresponding to the current node, (ii) one or more second flags that indicate whether or not first chrominance quantization coefficients exist in the transform unit corresponding to the current node, and (iii) one or more third flags that indicate whether or not second chrominance quantization coefficients exist in the transform unit corresponding to the current node.

2. An image decoding apparatus, comprising:

a processor; and a memory having a computer program stored thereon, the computer program causing the processor to execute operations including:

determining a coding standard to which coded video data conforms;

setting a driving frequency for decoding the coded video data according to the determined coding standard;

decoding the coded video data to generate quantization coefficients and pieces of management information, the quantization coefficients each corresponding to a corresponding one of transform units, and the pieces of the management information indicating a structure of the transform units, wherein the pieces of the management information have a tree structure, wherein each of the transform units corresponds to a corresponding one of leaf nodes in the tree structure, wherein the decoding includes decoding, for each of the leaf nodes, a set including (i) a coded piece of the management information and (ii) a coded quantization coefficient arranged next to the coded piece of the management information, the sets being arranged in succession in the coded video data, wherein the leaf nodes include a first leaf node and a second leaf node, wherein the set corresponding to the first leaf node including the coded piece of the management information and the coded the quantization coefficient for the first leaf node is arranged in the coded video data before the set corresponding to the second leaf node including the coded piece of the management information and the coded quantization coefficient for the second leaf node, such that in the decoding, the set corresponding to the first leaf node is decoded before the set corresponding to the second leaf node is decoded, wherein the management information includes one or more split flags, each of which indicates whether or not a current node is further split into nodes at a level lower than a current level for a transformation, and wherein the management information includes (i) one or more first flags that indicate whether or not luminance quantization coefficients exist in the transform unit corresponding to the current node, (ii) one or more second flags that indicate whether or not first chrominance quantization coefficients exist in the transform unit corresponding to the current node, and (iii) one or more third flags that indicate whether or not second chrominance quantization coefficients exist in the transform unit corresponding to the current node.

* * * * *